Jan. 9, 1951

R. M. HESSERT ET AL 2,537,529

DOCUMENT PHOTOGRAPHING MACHINE

Filed March 30, 1944

Inventor
Raymond M. Hessert
Friedrich J. Schutt

Attorney

Inventor
Raymond M Hessert
Friedrich J Schutt

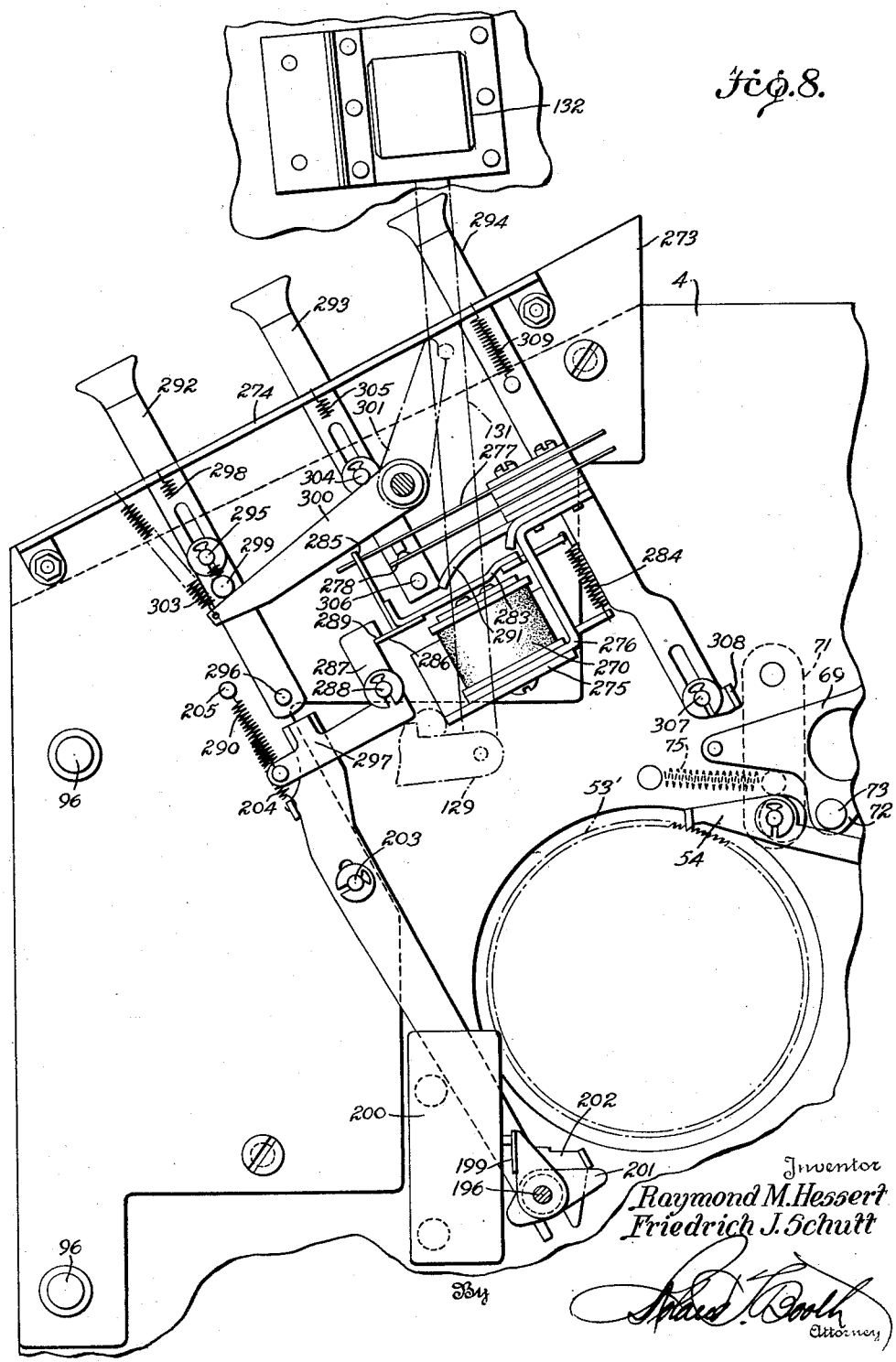

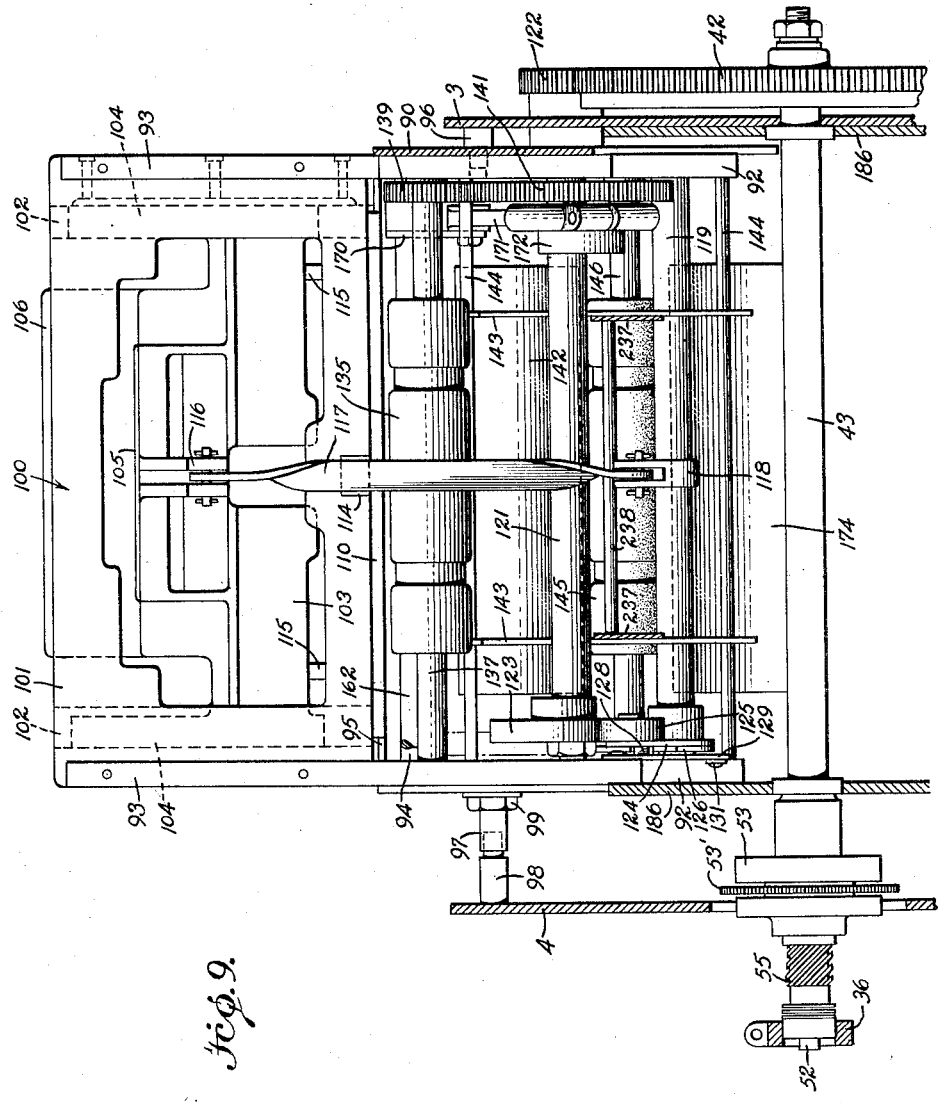

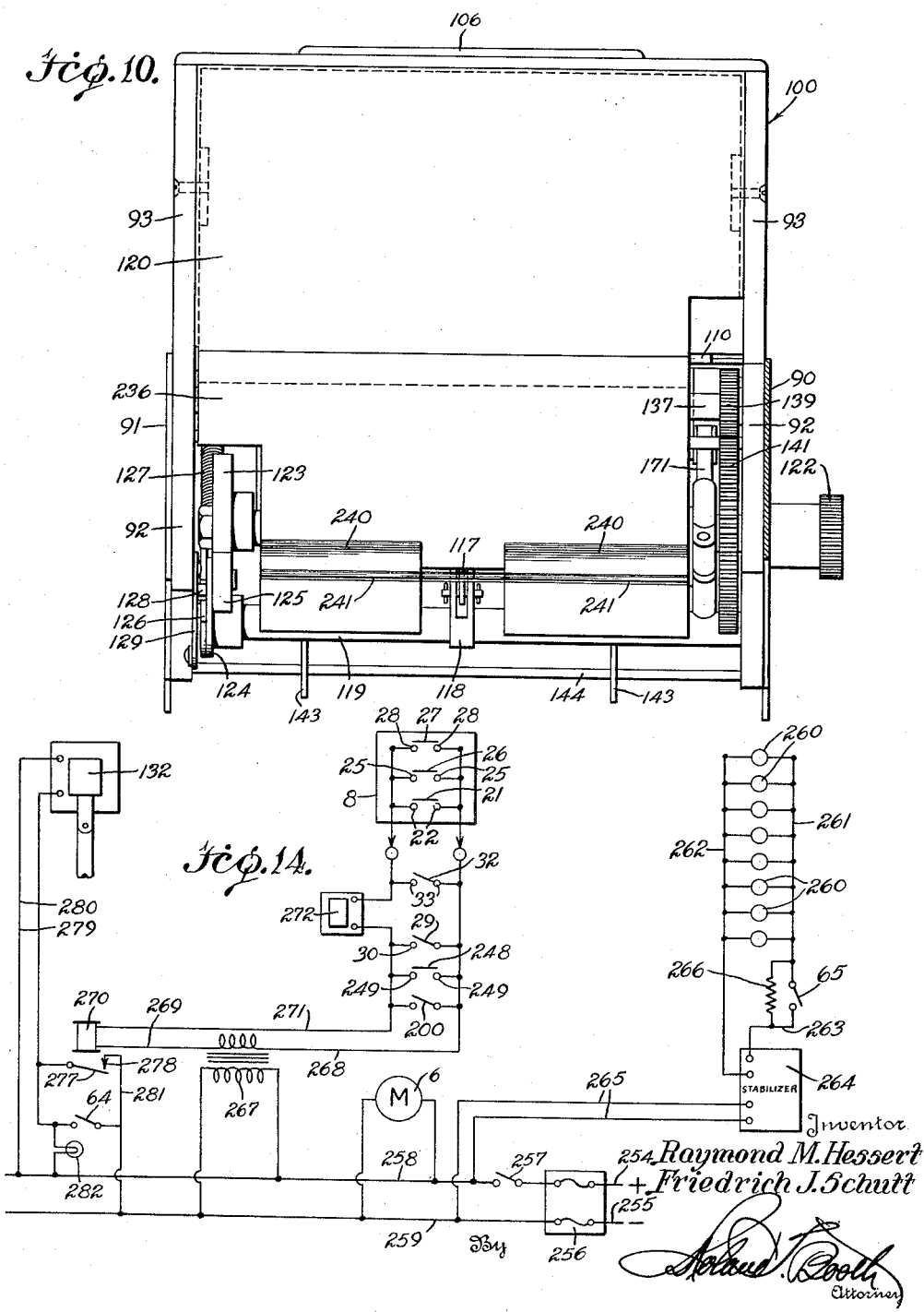

Jan. 9, 1951 R. M. HESSERT ET AL 2,537,529
DOCUMENT PHOTOGRAPHING MACHINE
Filed March 30, 1944 12 Sheets-Sheet 11
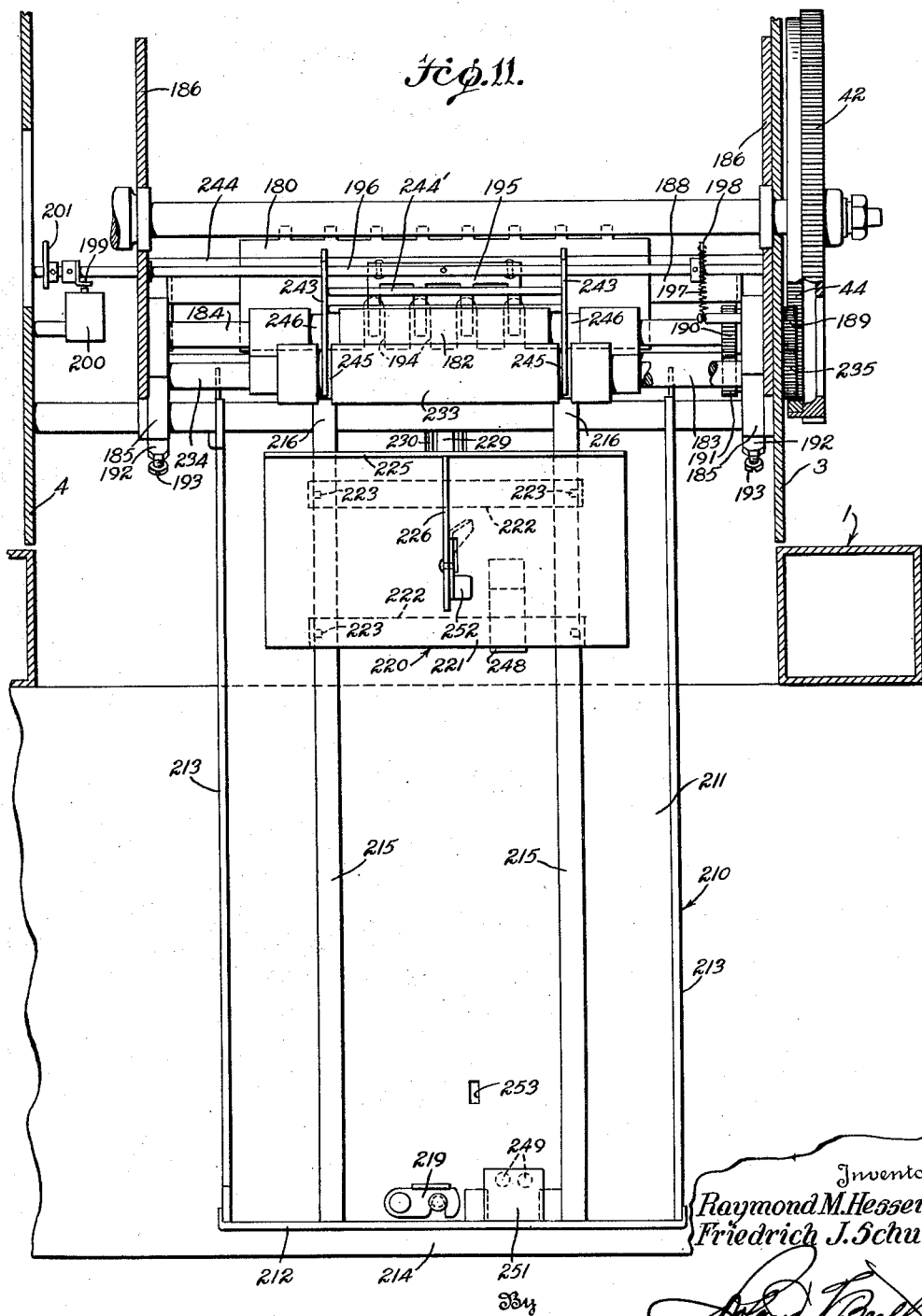
Inventor
Raymond M. Hessert
Friedrich J. Schutt
By
Attorney

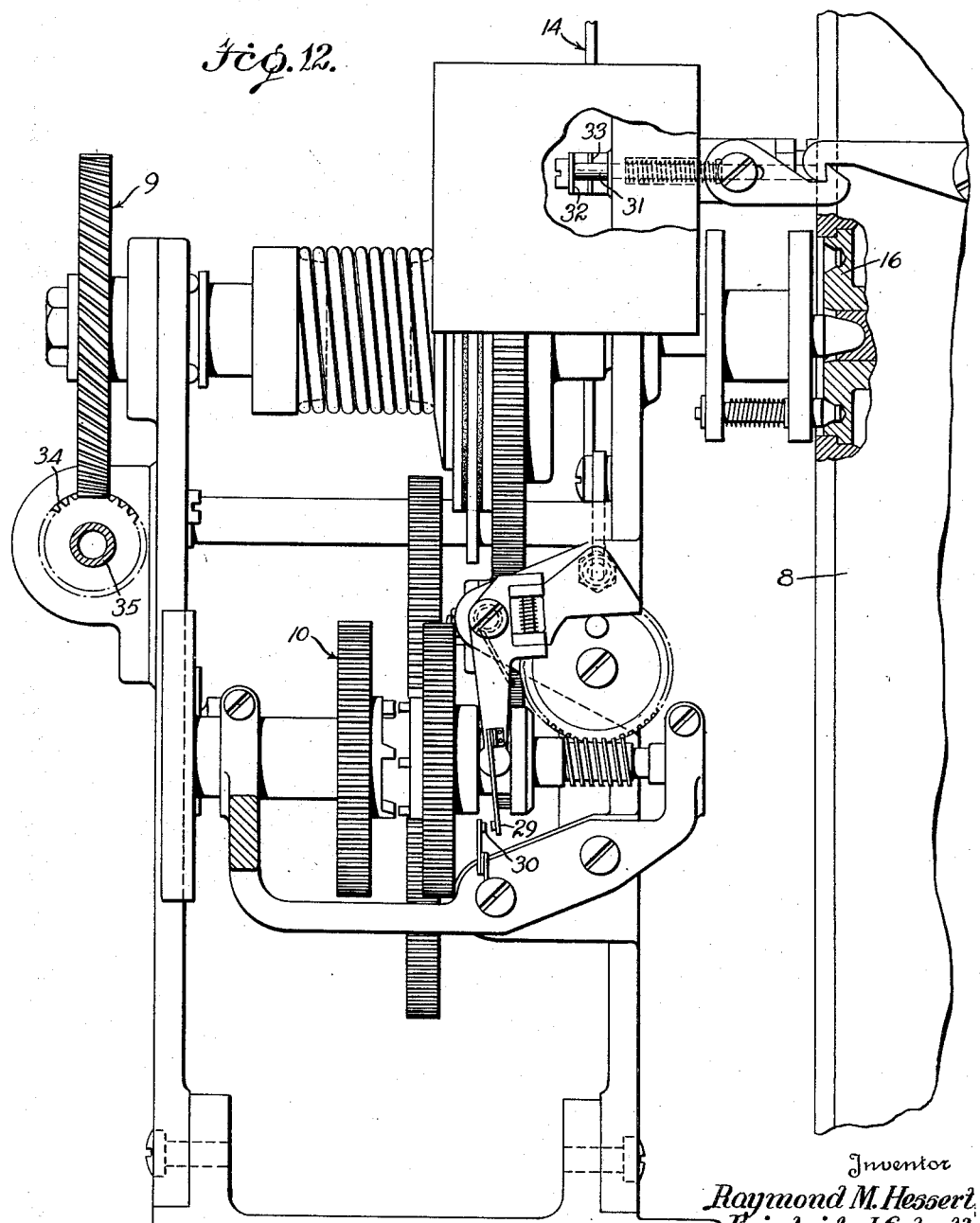

Patented Jan. 9, 1951

2,537,529

UNITED STATES PATENT OFFICE 2,537,529

DOCUMENT PHOTOGRAPHING MACHINE

Raymond M. Hessert, Buffalo, and Friedrich J. Schutt, Brooklyn, N. Y., assignors to Remington Rand Inc., Buffalo, N. Y., a corporation of Delaware Application March 30, 1944, Serial No. 528,683

11 Claims. (Cl. 88—24)

The present invention is incorporated in a document photographing machine particularly adapted for rapidly photographing a series of documents of uniform size.

The invention provides a document photographing machine with a magazine for receiving a plurality of documents of substantially uniform size to be photographed, means for feeding the documents from the magazine one at a time in successive order through a photographing position where they are photographed with subsequent stacking of the documents in a receiving member, and control means arranged to stop the feed of the documents at the magazine following the failure of a document to be fed from the magazine in any feeding operation, with provision being made for completing the feeding and photographing of the documents that have left the magazine and their stacking in the receiving member.

The invention comprehends the provision of controlling means on a document photographing machine having a magazine from which documents are automatically fed through the machine for photographing arranged to stop the feed of documents from the magazine when the feeding device at the magazine fails to feed a card therefrom in any operation thereof; when the receiving member is full; when the film breaks; when the film is near the end; when the receiving reel in the camera is full; when the cover on the casing of the machine is opened and closed; when the camera is removed from the machine; when the lead strip feed is operating; and when the light housing is left in an open position, with the provision in each instance of a continued operation of the feed means for the document beyond the magazine that will complete the feeding and photograhing of fed documents with the subsequent stacking thereof in the receiving member.

The invention further comprehends the provision of a document reversing mechanism in a document photographing machine that will provide for the feeding of documents from the magazine with the printed faces of the documents directed toward the bottom of the magazine so that the reversing mechanism will reverse the documents to present the printed faces to the camera for photographing and subsequently stack them in the same order in the receiving member that they had when placed in the magazine.

The invention comprehends the provision of controls on a document photographing machine for controlling the automatic feed of documents from a magazine manually actuated for starting and stopping the machine and arranged so that all of the documents that have been removed from the magazine will have the feeding operation thereof through the machine completed to photograph and stack them in the receiving member whenever the feed of further documents from the magazine is stopped. These manual controls are arranged to operate in conjunction with automatic document control mechanism so that the operation of a manual control is employed to start the machine until documents have been fed past the photographing position into the receiving member when automatic document control means will be actuated to provide for continuous operation of the machine to feed and photograph documents independently of the manual controls until the feed of a document fails in the operation of the feed mechanism at the magazine or until the controls are manually operated to stop the machine, provision being made for completing the photographing of any documents fed from the magazine and their stacking in the receiving member in the operation of the controls.

The invention provides for the manual operation of control means to start a document photographing machine having a magazine for receiving documents that are automatically fed therefrom through the machine into a receiving member, with subsequent document controlled means for maintaining continuous operation of the machine to feed and photograph documents independently of the manual control means for stopping the machine and preventing the feed of documents from the magazine independently of the manual control whenever conditions exist in the machine that would prevent the photographing of a document fed through the photographing position.

The invention further comprehends the provision of a document photographing machine having mechanism for automatically feeding and reversing documents, constructed for feeding, reversing and photographing documents at a rapid rate arranged to feed the documents in uniform relation one at a time in successive order with the provision of control means for the feed of documents to stop the feed of the documents whenever the uniform feeding of documents fails.

The invention further comprehends the provision of a document photographing machine having the mechanism for feeding documents therethrough into a receiving member so arranged that the documents are successively fed into the receiving member in the same order in which they are arranged in the magazine, and having the receiving member provided to continuously receive documents in a manner that will provide for manual removal of groups of documents from the receiving member without interfering with the continuous operation of the machine in feeding and delivering documents thereto.

The invention further comprehends features of construction for the convenient mounting of the magazine, card feeding and reversing mechanism and receiving member on the machine in a manner that will facilitate assembly, adjustment, operation and maintenance, and an arrangement of controls for efficiently controlling the operation of the machine, that are hereinafter more particularly pointed out, described and claimed.

In the drawings:

Fig. 1 is a side elevation of a document photographing machine incorporating the invention, the casing for the machine being omitted, the machine being shown from the right-hand side with portions of the magazine and receiving member for documents being broken away and other portions of the machine being broken away for convenience in illustrating the general arrangement of the machine construction.

Figure 4:
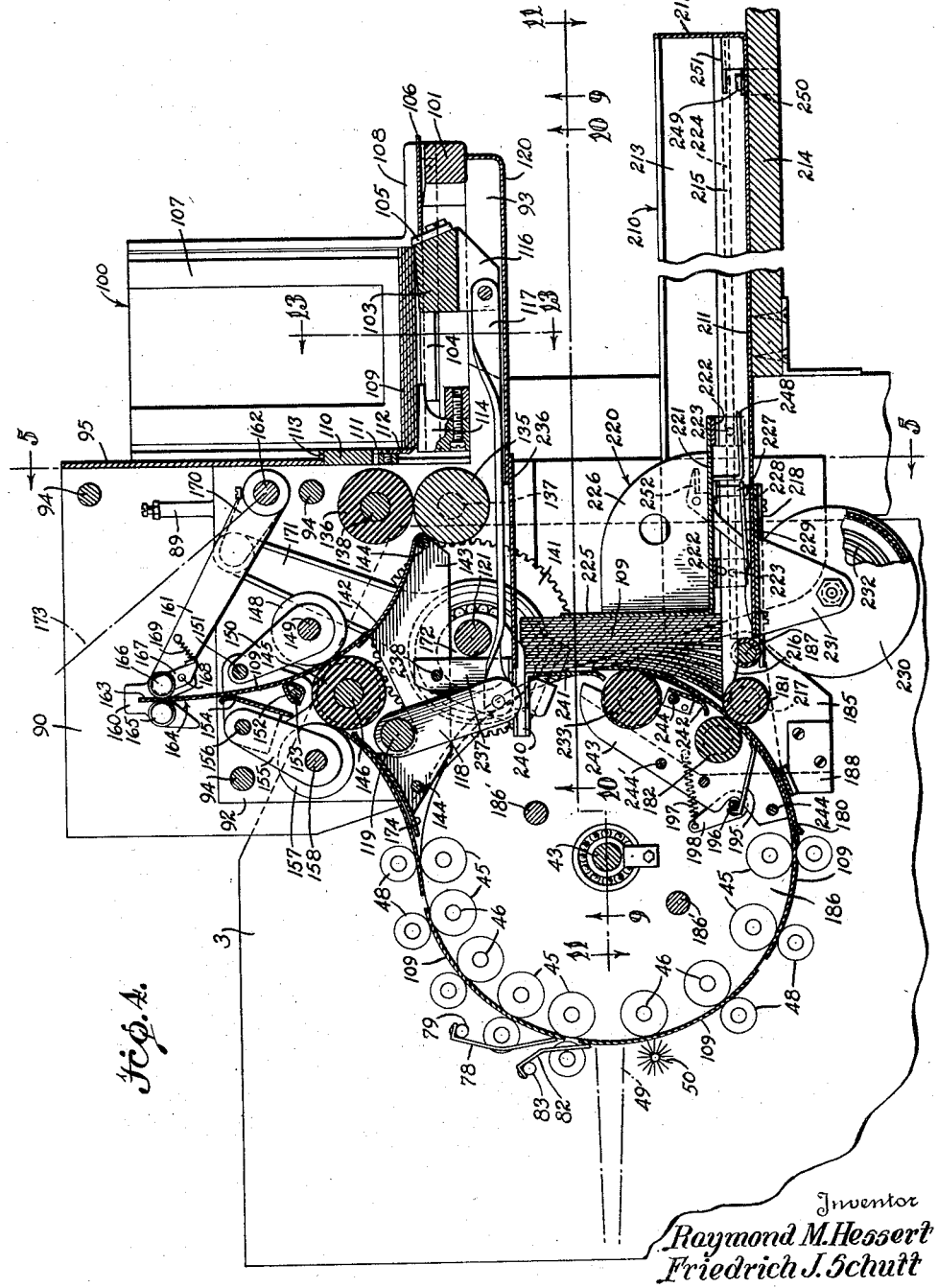
Figure 5:
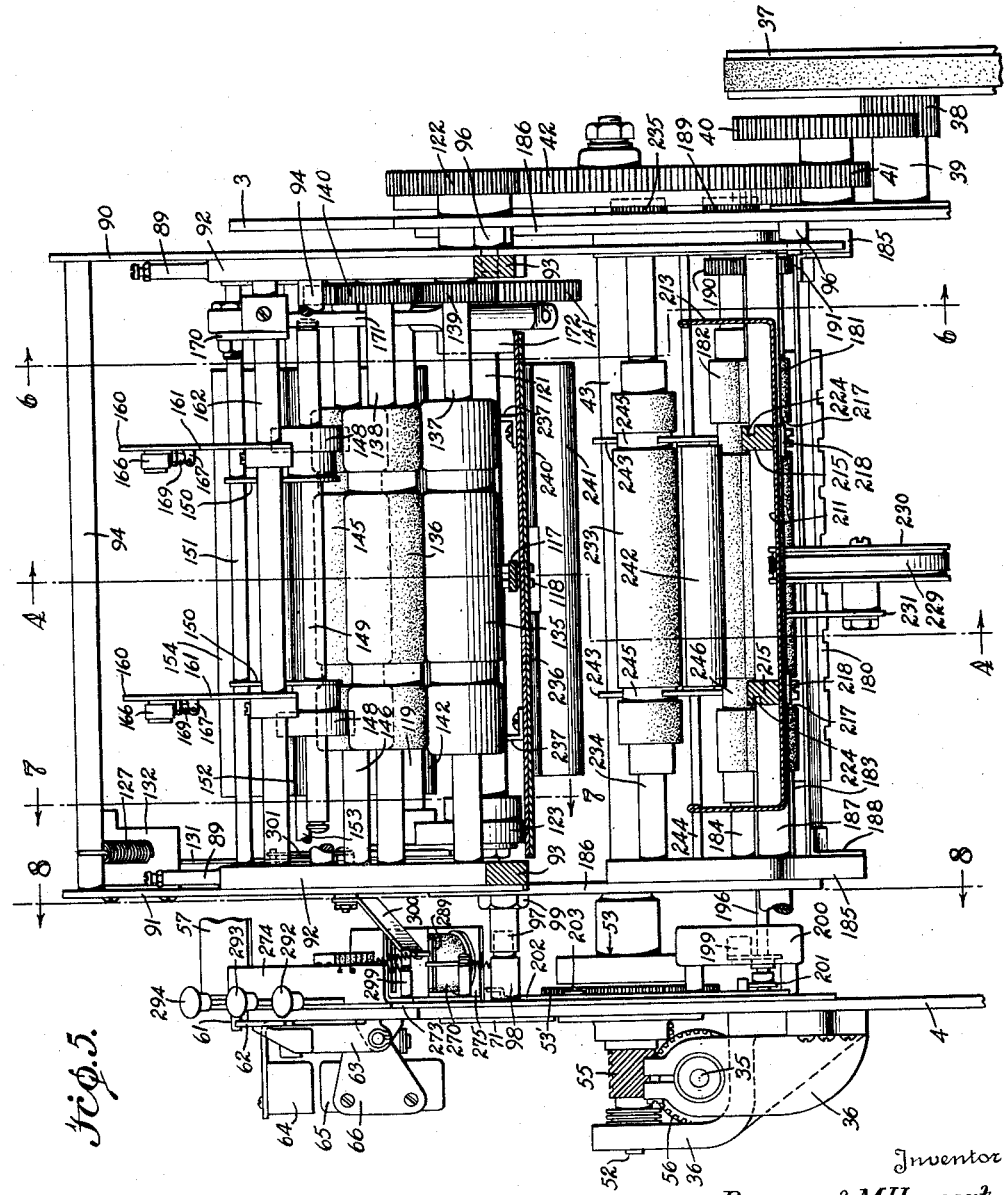

Fig. 4 is a vertical longitudinal cross-section taken on line 4—4 of Fig. 5, the casing for the machine being omitted, portions of the document feed mechanism being shown diagrammatically, a plurality of documents being illustrated in various positions through which they pass during the feeding and photographing operation from the magazine to the receiving member, and parts of the document feed mechanism illustrated in the position of operation where the trailing edge of a document is leaving the last pair of feed rolls in the document reversing mechanism and entering the feed rolls of the portion of the document feeding mechanism that conveys the documents through the photographing position.

Fig. 5 is a vertical transverse cross-section taken on line 5—5 of Fig. 4 illustrating the document feed and reversing mechanism and portions of the receiving member, in front elevation.

Figure 6:
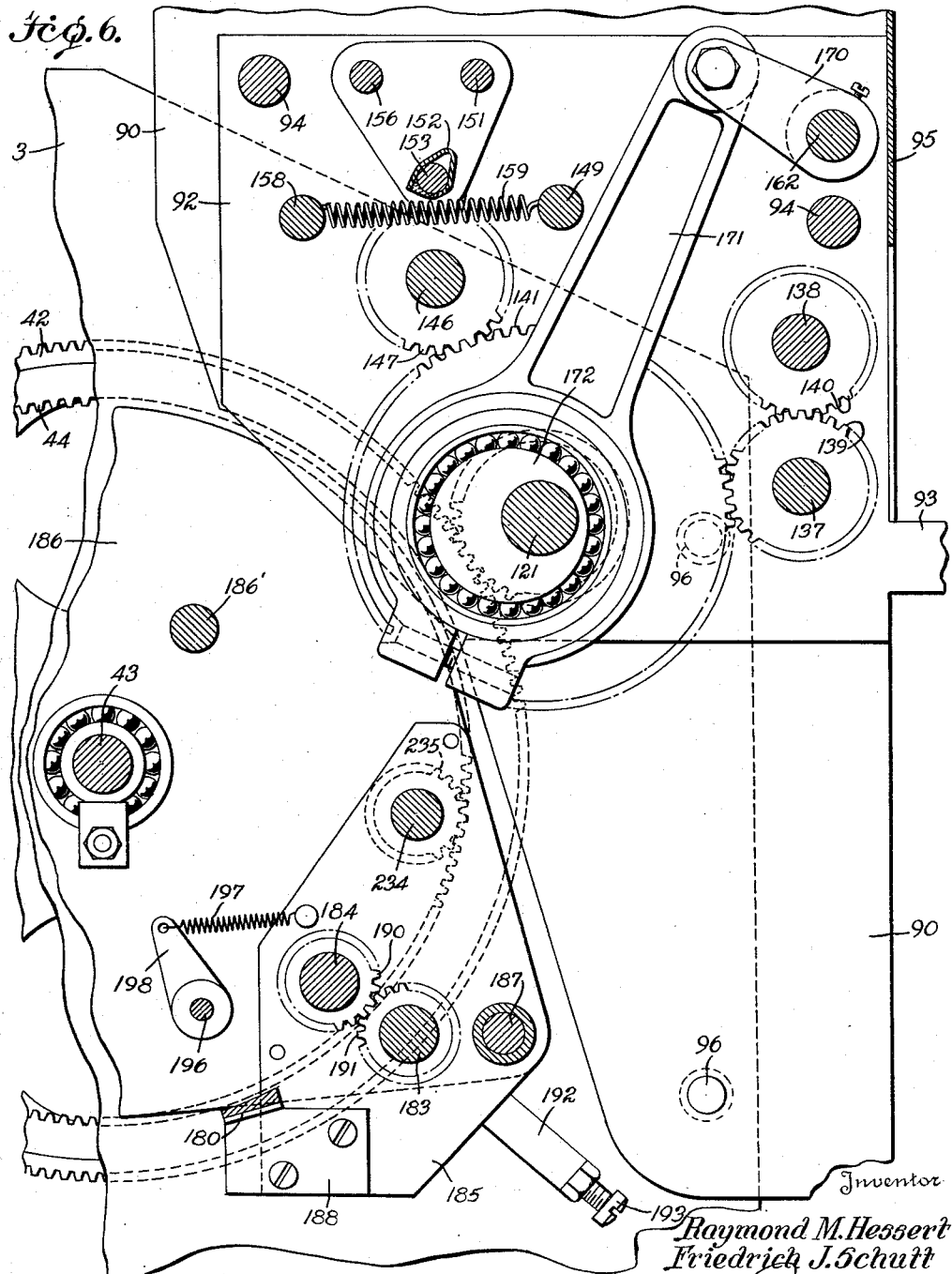

Fig. 6 is an enlarged detail cross-section taken on line 6—6 of Fig. 5.

Figure 7:
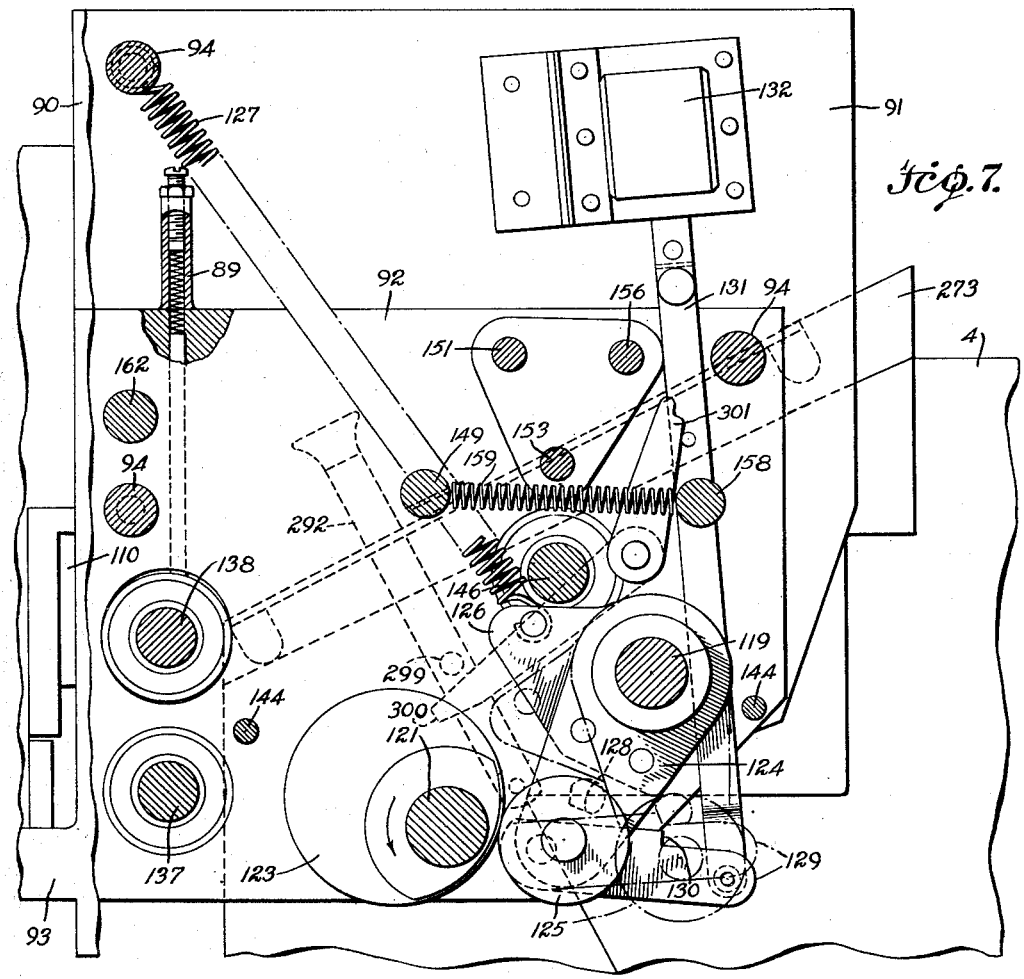

Fig. 7 is an enlarged detail cross-section taken on line 7—7 of Fig. 5.

Fig. 8 is an enlarged vertical cross-section taken on line 8—8 of Fig. 5.

Fig. 9 is a horizontal transverse cross-section taken on line 9—9 of Fig. 4 looking up at the bottom of the magazine and the document feed and reversing mechanism with the bottom cover plate for the magazine removed.

Fig. 10 is a transverse horizontal cross-section taken on line 10—10 of Fig. 4 looking upwardly and showing the upper portion of the card receiving member and the bottom of the magazine.

Fig. 11 is a transverse horizontal cross-section taken on line 11—11 of Fig. 4 looking downwardly and showing the document receiving member and portions of the feed mechanism for delivering documents thereto.

Figure 2:
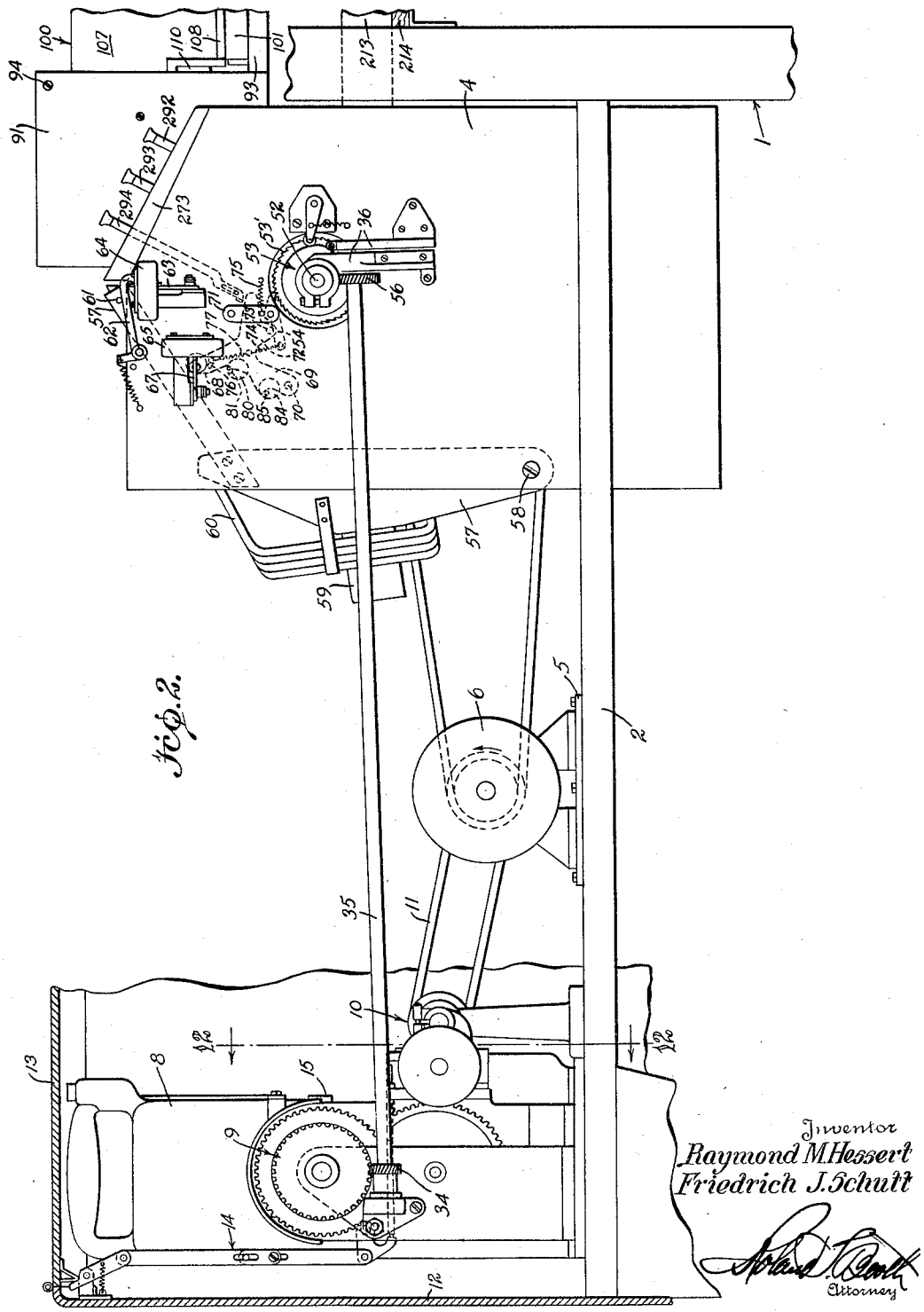
Fig. 2 is a side elevation showing the left-hand side of the machine, the outer casing being omitted except for fragments thereof shown in cross-section in order to disclose the general construction and assembly of the machine.

Fig. 12 is a vertical transverse cross-section taken on line 12—12 of Fig. 2 showing the lead strip feed, camera mounting, portions of the film drive connected therewith, and the switches controlled thereby.

Figure 13:
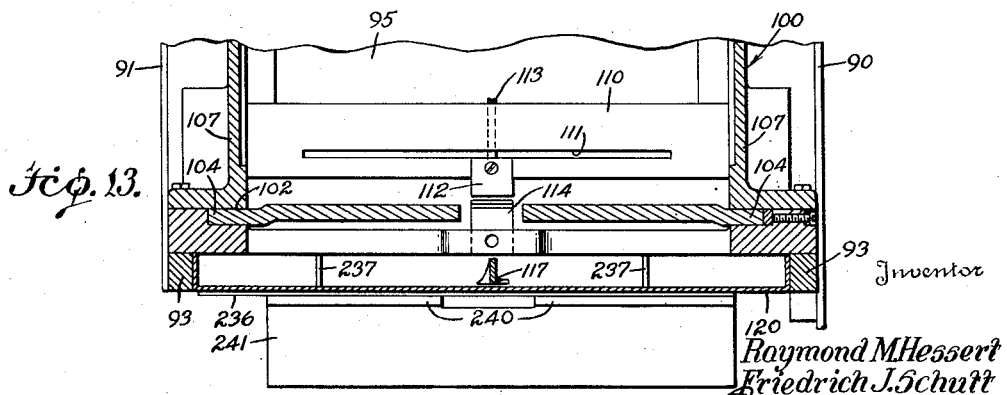

Fig. 13 is a vertical cross-section taken on line 13—13 of Fig. 4 through the document feed magazine.

Fig. 14 is a wiring diagram showing the electrical circuits and controls.

The invention disclosed in this application is an improvement over the document photographing machine disclosed in co-pending application Serial Number 472,359, filed January 14, 1943, now Patent No. 2,482,127, of December 20, 1949. The frame structure, the camera structure, the film feed, the lead strip feed, the drive means, the light mounting unit and part of the document feed mechanism for feeding the documents through the photographing position with the clutches and drive mechanism for operating the camera are all constructed in accordance with the disclosure in the aforementioned co-pending application. Only sufficient of the structure of the machine is illustrated to disclose the construction and arrangement of the machine as it corresponds to that in the aforementioned application so that the improvements added with the control mechanism forming the subject matter of the present invention can be clearly understood in connection with the construction, assembly, operation and control provided by the present invention and its association with those portions of a document photographing machine constructed in accordance with the co-pending application. Portions of the document feed and light control mechanism correspond with the structure shown in other co-pending applications filed on even date herewith.

Figure 1:
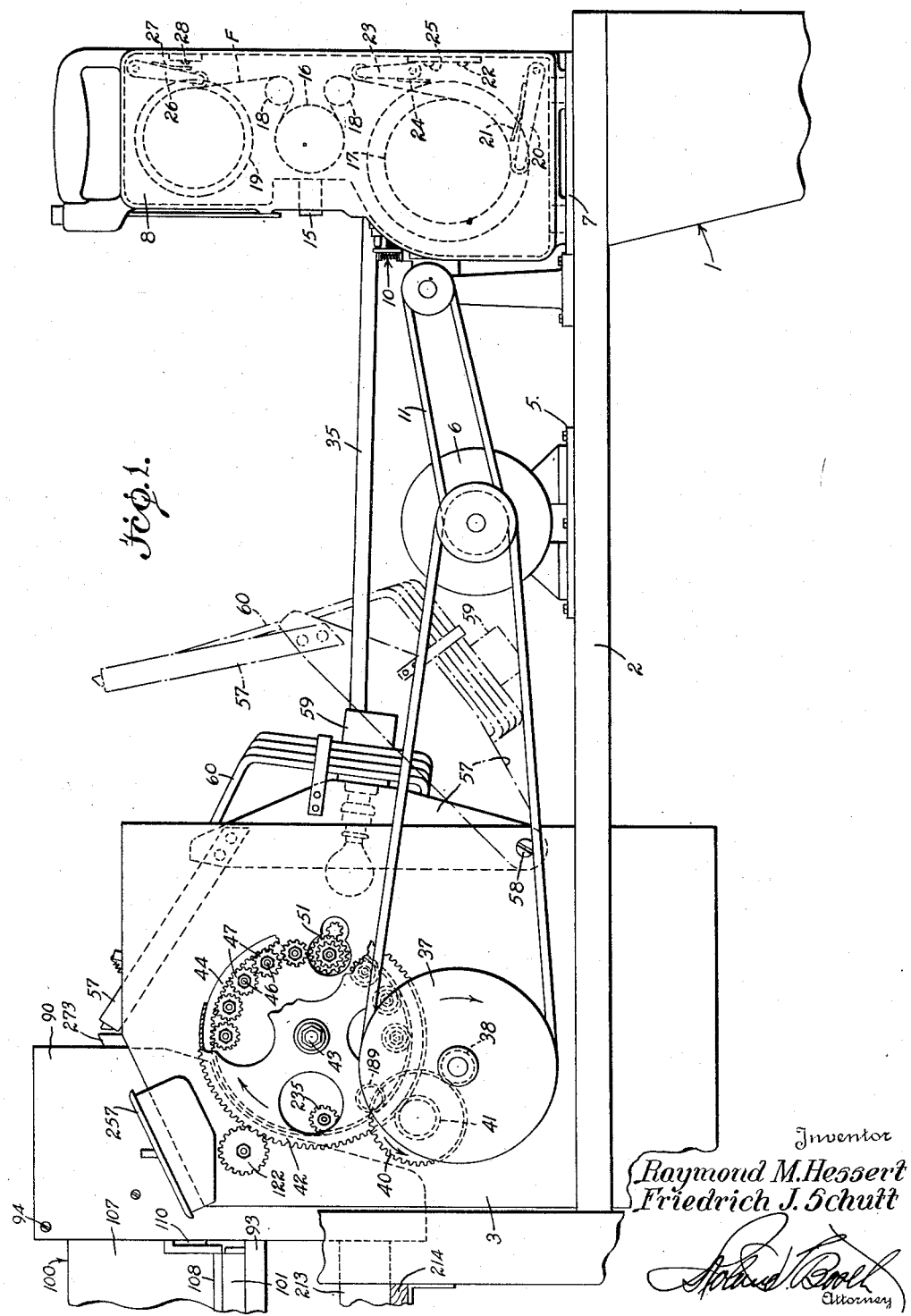

As more particularly illustrated in Figs. 1 and 2, the present machine is mounted upon a movable truck or base 1 including suitable legs for supporting the machine and a pair of longitudinally extending side bars 2. A pair of upright spaced parallel side walls 3 and 4 have the lower edges rigidly secured to side bars 2 at opposite sides of the machine and at the front ends of the side bars. The document feeding mechanism, the lighting device, portions of the drive mechanism and the controls for the machine are all supported by parallel side walls 3 and 4. A cross plate 5 extends transversely across the central portion of the machine and is secured to the upper edges of side bars 2 for mounting a suitable electric motor 6 providing the source of power for driving the various units of the present machine. A cross plate 7 has opposite ends secured to the rear ends of side bars 2 and extends transversely across the rear end of the machine to support the camera 8, portions of the drive mechanism for feeding the film in the camera generally indicated by the numeral 9 and a lead strip feeding device associated therewith indicated generally at 10 directly driven from motor 6 by an endless belt 11.

The machine is enclosed within and rendered light-proof by a suitable casing 12 secured to side bars 2. Casing 12 has a top rear cover 13 hinged at the rear upper edge of the casing carrying an operating member for engaging and actuating a linkage mechanism 14 to operate a release and control member for the lead strip feed 10 that in both opening and closing movements of the cover will be operated to release the lead strip feed so that it will produce a cycle of operation for feeding a predetermined amount of film strip in the camera. This lead strip feed as disclosed in the aforementioned co-pending application is used for winding a sufficient length of film or lead strip to protect the portion of the film provided with exposed document photographs so that when the cover is opened and the camera removed for changing the film or for any other purpose, the amount of film or lead strip fed by the lead strip feed mechanism will prevent the photographed film from being light struck.

The camera 8 is removably mounted in the machine and is in the form of a closed unit having a lens unit in the central portion indicated at 15 to focus the image of documents being fed through the photographing position on film F indicated in dotted lines and fed through a focal position by a film feed roller 16, shown in dotted lines in Fig. 1. The film is unwound from a supply spool 17 and passed over idle rollers 18 at opposite sides of film feed roller 16 and afterwards wound on receiving spool 19. A contact arm 20 is pivoted at the bottom of the camera and is spring pressed in order to maintain engagement of the roller on the free end thereof with the film on supply spool 17. Arm 20 carries a contact 21 adapted to close the circuit through stationary contacts 22 whenever the film supply on the supply spool is nearly exhausted. A pivoted arm 23 mounted in the camera has a roller on the free end for engaging the film after it leaves supply spool 17 and is provided with a contact 24 adapted to engage and close the circuit through stationary contacts 25 in case of film breakage. A pivoted contact arm 26 is mounted in the upper end of the camera and carries a roller on the free end for engaging the film on receiving spool 19. A movable contact 27 carried by pivoted contact arm 26 is adapted to engage to close the circuit through stationary contacts 28 on the upper rear portion of the camera case when the receiving spool is full.

A pair of contacts 29 and 30 are mounted on the lead strip feed 10 as shown in Fig. 12 and are arranged to normally remain in disengaged relation when the lead strip feed is not operating. Whenever the lead strip feed is released for operation by raising or lowering rear cover 13, then contacts 29 and 30 are engaged to close the circuit therethrough in a manner that will be hereinafter described.

When camera 8 is engaged in the machine in position to take pictures of documents, the mounting of the camera in the machine provides for engagement of the camera with an actuating pin 31 carried by portions of the supporting structure for the drive mechanism 9 for feeding film in the camera and also for providing means for positioning the camera in operative position in the machine. The operation of actuating pin 31 for the camera causes it to engage contact 32 and separate it from contact 33 carried by the film feed supporting structure so as to break the circuit through the contact and maintain the circuit open as long as the camera is engaged in proper position in the photographing machine for photographing documents in the operation of the machine. Drive mechanism 9 for feeding film has parts detachably interengaged with film feed roller 16 in order to rotate roller 16 in the operation of the film feed mechanism for feeding film in the taking of pictures and also for feeding the film and lead strip by means of the lead strip feed, in the manner generally described above. This drive mechanism for feeding film indicated at 9 includes a suitable clutch structure geared with the lead strip feed so the lead strip feed can operate the camera to feed film independently of the feeding of film by the drive mechanism 9 operated in the feeding of documents.

The portion 9 of the drive mechanism for feeding film is operated by a worm 34 carried by a drive shaft 35 rotatably mounted at the rear end on the supporting structure for drive mechanism 9 and at the forward end in a bearing bracket structure 36 mounted on left-hand upright side wall 4, as shown in Fig. 2.

Figure 3:
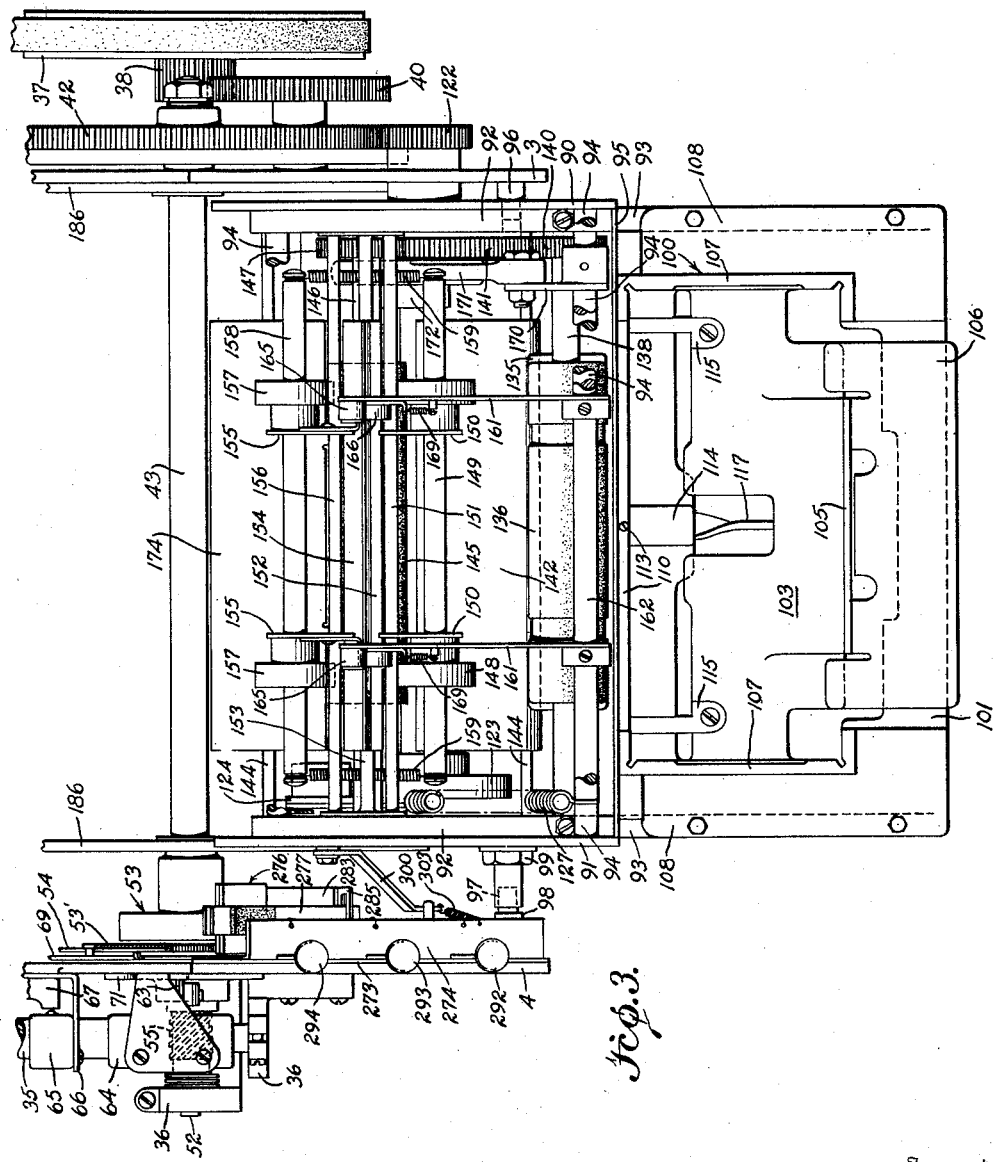
Fig. 3 is an enlarged plan view of the front end of the machine with the casing removed showing the document receiving magazine, the document feeding and reversing mechanism and parts of the machine associated therewith, portions being broken away and shown in section for convenience in illustration.

The main drive mechanism for the document feed and the camera has a main drive pulley 37 rigidly connected with gear 38 both rotatably mounted on a projection 39 carried by right-hand side wall 3. Gear 38 is in mesh with a larger gear 40 mounted on one end of a sleeve carrying gear 41 on the opposite end. Gears 40 and 41 together with the sleeve on which they are mounted are rotatably carried by a stub shaft secured to right-hand side wall 3. Gear 41 is in mesh with a main drive gear 42 mounted on one end of the main drive shaft 43 extending transversely across the front end of the machine and journalled in the end plates of the document feed unit and bracket 36. Main drive gear 42 is on the outside of side wall 3, as shown in Figs. 3, 5 and 6, and has a lateral flange formed thereon mounting an internal gear 44.

The document feed means includes a plurality of main feed rolls indicated diagrammatically, in Fig. 4, at 45. These main feed rolls are carried by a plurality of spaced parallel main feed roll shafts 46 arranged with the axes of the shafts in a cylindrical path. Shafts 46 each have one end projecting through side walls 3 to the right-hand side of the machine where they each mount a small pinion 47 in mesh with internal gear 44 as shown in Fig. 1. A plurality of idler feed rolls 48 are mounted on shafts rotatably mounted between side walls 3 and 4 and arranged in a cylindrical path concentric to the path of main feed rolls 45 in paired relation with main feed rolls 45 in the manner disclosed diagrammatically in Fig. 4. Idler feed rolls 48 are spring pressed toward main feed rolls 45 and are mounted in the machine for operation in the manner disclosed in the aforementioned co-pending applications also disclosing all of the hereinabove described structure of the motor, lead strip feed, camera structure and film drive mechanism.

This document feed mechanism including feed rolls 45 and 48 cooperates to feed documents through a photographing position indicated at 49. A rotary brush 50 is mounted to engage the outer face of documents as they leave the photographing position 49 in cooperation with one of main feed rolls 45. The brush is rotated at a higher speed than main feed roll 45 to keep the documents tensioned during their passage through the photographing position. For this purpose brush 50 is driven by gear train 51, as indicated in Fig. 1, from internal gear 44. The manner of mounting brush 50 and operating it is fully disclosed and described in the aforementioned co-pending applications.

A supplemental drive shaft 52 is mounted at the left-hand side of the machine in coaxial relation with main drive shaft 43 having the ends of the two shafts terminating in adjacent relation and mounting parts of a clutch 53. Clutch 53 is normally adapted to operate so that when released it will automatically engage to drive supplemental drive shaft 52 therethrough from main drive shaft 43. A clutch control ring 53' has ratchet teeth on the periphery for engagement by a clutch control pawl 54. The construction and operation of clutch 53 is clearly disclosed in the aforementioned co-pending application.

The free end of supplemental shaft 52 carries a worm gear 55 meshing with worm gear 56 on the end portion of shaft 35 adjacent bearing 36, as shown in Fig. 2. It will be understood that when the clutch parts are engaged shaft 35 is driven from main drive shaft 43 for feeding film in the camera in properly timed relation with the feed of documents by main feed rolls 45.

The present document machine is of the type having a slotted aperture plate in the lens unit arranged with the feed of documents and film so that as documents are fed downwardly about the cylindrical path in the machine by main feed rolls 45 through the photographing position, the film in the camera will be fed upwardly in the camera past the focal position by film feed roller 16 to photograph successive documents on the film in the uniform continuous feeding of the documents and the film in a manner well-known in the art.

A lighting unit is provided for illuminating the document so that the proper amount of light is reflected from the documents into the camera for taking the photograph. This lighting unit includes a frame 57 hingedly mounted at the lower end at 58 to the lower rear portions of side walls 3 and 4, as clearly shown in Figs. 1 and 2. Frame 57 has a lamp housing 59 which carries a plurality of lamp bulbs in transversely extending relation therein arranged to project light toward the photographing position at 49 when frame 57 is in the closed operative position as shown in full lines in Figs. 1 and 2. This frame is also movable to an open position to provide access to the document feed mechanism which is shown in dotted lines in Fig. 1. Frame 57 also carries light indicator means indicated at 60 adapted to indicate when the lights are operating and also to indicate when one or more lamp bulbs are burned out, in a manner disclosed in the aforementioned co-pending applications.

Frame 57 has an operating pin 61 carried by the upper left-hand free end portion as shown in Fig. 2, which extends above the upper edges of side wall 4. When frame 57 is in the closed operative position pin 61 engages a pivoted switch operating lever 62 and rotates it in a clockwise direction as shown in Fig. 2 to move the hooked free end of the switch actuating lever 62 out of engagement with bell crank switch operating lever 63 for allowing micro-switch 64 to have the contacts therein disengaged to open the circuit controlled thereby. Switch operating lever 62 is normally spring actuated in a counter-clockwise direction, as shown in Fig. 2, to bring the hooked end thereof into engagement with the free end of bell crank switch operating lever 63 for operating micro-switch 64 to close the circuit controlled thereby in a manner that will be hereinafter described.

A micro-switch 65, Fig. 2, is mounted on left-hand side wall 4 and is adapted to control the circuit for the lights carried in lamp housing 59. Micro-switch 65 is mounted on a supporting bracket 66 which supports switch 65 on side wall 4 and also pivotally mounts bell crank switch operating lever 67. One end of bell crank lever 67 is adapted to operate the switch while the opposite end extends through an opening in side wall 4 and is formed with an inclined end for engaging with an operating pin on the projecting arm 68 of a film feed and light control lever 69 pivoted on the inner face of side wall 4 at 70.

Clutch control pawl 54 is pivotally mounted intermediate its ends on the free end of a link 71 is pivoted at its opposite end on the inner face of side wall 4 in a position adjacent lever 69.

Lever 69 has an extension 72 carrying an operating pin 73 projecting laterally therefrom over the upper edge of clutch control pawl 54, in the manner shown in Fig. 2. A spring 74 connects the free end of pawl 54 with control lever 69 and normally actuates pawl 54 to engage the teeth on clutch control ring 53'. Spring 74 also operates pawl 54 so that it tends to move into engagement with operating pin 73. When light control lever 69 is operated in a clockwise direction as shown in Fig. 2 it not only operates bell crank 67 for operating micro-switch 65 to close the circuit therethrough, but also through the medium of operating pin 73 operates clutch control pawl 54 so that it will be disengaged from clutch control ring 53' and allow the clutch members to engage for driving shaft 52 and feeding the film in the camera.

A tension spring 75 is connected at opposite ends to link 71 and side wall 4 respectively, and acts as a shock absorber when clutch control pawl 54 engages the teeth on clutch control ring 53' in stopping operation of the film feed. It will be noted that link 71 is on the outside of side wall 4 while pawl 54 is supported at the inside of the side wall, the pin pivotally mounting pawl 54 on link 71 extending through an opening in side wall 4. The position and size of the opening in side wall 4 determines the extent of movement of link 71 on its pivot. Light control lever 69 has its movement limited by a pin secured to side wall 4 and extending through a slot in projecting arm 68 as indicated at 76. A tension spring 77 is connected to lever 69 at the lower end and to a pin for limiting the movement of lever 69 at the upper end and normally moves control lever 69 in a counter-clockwise direction to the position shown in Fig. 2, when the light circuit is open and the film feed disengaged. The construction and operation of control lever 69 is disclosed in a co-pending application filed simultaneously herewith.

Control lever 69 is document actuated by means of the documents as they are fed between feed rolls 45 and 48. Just prior to the time a document reaches the photographing position at 49 it will engage primary control fingers 78 carried by shaft 79 so that the shaft is rotated for rotating disc 80 on the left-hand end thereof having a pin 81 arranged to engage the edge of projecting arm 68 so that lever 69 will be rotated in a clockwise direction as shown in Fig. 2 to operate micro-switch 65 to close the circuit controlled thereby for energizing the lights to illuminate the document in passing through the photographing position. It will be noted that the document operates primary control fingers 78 just prior to the time the leading edge of the document reaches the photographing position. The arrangement is made so that the circuit is closed sufficiently in advance of the leading edge of the document reaching photographing position that the lights will be fully energized and illuminated to full brilliance when the leading edge of the document enters the photographing position. Secondary control fingers 82 are mounted on shaft 83 which is rotated when fingers 82 are operated by the document just prior to the entrance of the document into the photographing position. A disc 84 is mounted on the left-hand end of shaft 83 and in the rotation thereof by document engaging fingers 82, moves pin 85 eccentrically mounted on disc 84 in a clockwise direction to engage control lever 69 and move it in a clockwise direction to operate micro-switch 65 to close the circuits to the lamps and to hold it closed in conjunction with the operation of control fingers 78. Both sets of control fingers 78 and 82 operate lever 69 to disengage pawl 54 from clutch control ring 53' for feeding the film. The arrangement is such that the disengagement of pawl 54 from control ring 53' is subsequent to the closing of microswitch 65 so that film is not fed until the leading edge of a document reaches the photographing position and the lights are at full brilliance. Control lever 69 is constructed and arranged to secure this timing of the operation of micro-switch 65 slightly in advance of the disengagement of pawl 54 from control disc 53'.

Secondary control fingers 82 maintain microswitch 65 closed and pawl 54 disengaged from ring 53' after the trailing edge of the document leaves primary control fingers 78 so that the counter-clockwise movement of lever 69 is not started by spring 77 until the trailing edge of a document has entered the photographing position. This provides for the operation of the machine in such a manner that the trailing edge of the document can move through the photographing position indicated at 49 and have the photographing of the trailing edge completed before pawl 54 engages ring 53' and disengages the clutch for stopping the film feed and also provides for the operation of micro-switch 65 to the open position to open the circuit to the lights. The timing is such that the feed of film is stopped immediately after the trailing edge of the document leaves the photographing position so that film is not wasted. It will be obvious that if documents are not fed in their regular order and in closely adjacent relation as shown in Fig. 4 for example, control fingers 78 and 82 will not be operated during a large gap between two successively fed cards and therefore the lights will not be turned on and the film will not be fed. As a result, the images of photographs and documents on the film are always in close adjacent relation. This control structure for operating the lights and the clutch for feeding the film in timed relation as above described is shown in a co-pending application filed under even date herewith and is an improvement over the corresponding structure shown in the above-mentioned copending application Serial Number 472,359.

The present invention provides improvements on the structure above described for cooperation therewith to receive and automatically feed documents through the photographing position for photographing in rapid successive order with stacking of the documents in a receiving member after they have been photographed. Controls are also provided for operation by various parts of the mechanism of the machine for stopping the feed of documents whenever the machine fails to normally function in the feed and photographing of the documents on the film in the camera. The control is arranged however to provide for completing the photographing of the documents that have been fed from the document holding magazine and their stacking in the receiving member.

The structure for feeding the documents or cards automatically in the operation of the machine is constructed as a unit and mounted on side walls 3 and 4. This unit has a pair of side plates 90 and 91 respectively, at the right and left-hand sides of the unit. Bearing plates 92 are secured to the inner faces of side plates 90 and 91 and are formed to provide forwardly projecting spaced parallel horizontal supporting arms 93 at the lower front edges. Tie rods 94 secure side plates 90 and 91 with the attached bearing plates 92 in spaced parallel relation. A front plate 95 is secured to the front edges of side plates 90 and 91 and bearing plates 92 for cooperation with tie rods 94 in mounting the side plates and bearing plates in spaced parallel relation to form a rigid feed unit structure.

The card feed unit is detachably mounted between side walls 3 and 4. The mounting is obtained by means of a pair of supporting studs 96 having reduced shouldered ends projecting inwardly from the inner forward edges of side walls 3 and mounting thereon in vertical spaced relation. Side plate 90 is formed with a pair of apertures as shown in Fig. 6, for engagement over the reduced ends of studs 96 to seat against the shoulders thereon. The shoulders control the positioning of the card feed unit between side plates 3 and 4 so that the unit will be in proper registry with the drive means and card feed structure carried by side walls 3 and 4 for cooperation in feeding and photographing documents. Side plate 91 has a stud 97, Fig. 5, threaded in the central portion thereof in laterally extending relation. The outer end of stud 97 is provided with a socket to receive the reduced end of supporting stud 98 mounted on and projecting inwardly from side wall 4. When side plate 90 is engaged on supporting studs 96, threaded stud 97 can then be threadedly adjusted in side plate 91 to engage the recessed end thereof over the reduced projection on supporting stud 98. A lock nut 99 then secures stud 97 tightly in adjusted position to firmly secure and mount the card feed unit between side walls 3 and 4, in the manner disclosed in Figs. 3, 4 and 5.

A magazine 100 is mounted on forwardly extending arms 93 in front of front plate 95 in the manner shown in Fig. 4. The magazine has a base plate 101 mounted in horizontally extending relation with opposite ends secured to arms 93. The base plate has opposite ends formed to provide guideways 102. The central portion of the base plate is open leaving only portions at the front and rear of the base plate connecting the ends formed with guideways 102, as clearly shown in Figs. 3 and 4. A magazine slide 103 is formed with guide bars 104 at opposite ends slidably engaging in guideways 102 while intermediate the guide bars slide 103 provides a support for documents placed in the magazine. Magazine slide 103 has limited forward and rearward sliding movement in the opening in base plate 101. A picker knife 105 is mounted in transversely extending relation on the front inclined edge of magazine slide 103 as shown in Fig. 4 and is adjustable so that the upper edge projects above the upper face of magazine slide 103 a sufficient distance to engage the forward edge of the lowermost document only of a stack of documents piled in the magazine on top of slide 103. The adjustment of the knife can be made for varying thicknesses of documents placed within the magazine so that only the lowermost document will be engaged by the upper edge of the picker knife. A guard plate 106 is mounted on the front portion of magazine slide 103 and projects outwardly in horizontal relation over the upper face of base plate 101 to cover the opening in the base plate between the forward transverse portion of the base plate and the forward portion of slide 103.

End members 107 are mounted on opposite ends of base plate 101 at opposite sides of the machine and have the bottom portions formed to provide cover plates 108 for the ends of base plate 101 to slidably retain magazine slide 103 with its guide bars 104 in assembled slidable relation on the base plate. End members 107 extend in substantially vertical relation from the cover plate portions thereof and are of channel shape in cross-section to provide inwardly extending flanges on opposite edges for cooperation to provide a rectangular compartment for receiving a plurality of documents 109 in horizontal relation stacked one on top of the other on top of magazine slide 103 and held in this stacked position thereby.

A cross bar 110 has opposite ends secured to end members 107 and extends in transversely extending horizontal relation between the rear edges of end members 107, as shown in Fig. 4, near the lower ends thereof. Cross bar 110 is formed with a horizontal slot 111 having a vertical groove in the central portion to receive document control finger 112. A set screw 113 threaded in the central portion of cross bar 110 in vertically extending relation has the lower end extending through slot 111 to engage the bottom portion of the cross bar below the slot for flexing the lower portion of the cross bar downwardly with document control finger 112 so that the distance of the lower end thereof above control block 114 can be varied so the space is only slightly larger than the thickness of one document in order to prevent the feeding of more than one document from the bottom of the magazine by magazine slide 103 and picker knife 105. Control block 114 is rigidly secured to rear transversely extending portion of base plate 101 as shown in Fig. 4 and has a forwardly extending portion located in a central recess formed in magazine slide 103. Magazine slide 103 has a pair of rearwardly extending guide fingers 115 slidably engaged in grooves in the rear transverse portion of base plate 101, as shown in Fig. 3. In the reciprocation of magazine slide 103 these fingers extend to the rear of the magazine and support the cards being discharged from the bottom of the magazine between control finger 112 and control block 114.

Magazine slide 103 and picker knife 105 are reciprocated back and forth to deliver documents from the bottom of the pile in the magazine one at a time between control finger 112 and block 114 to the rear of the magazine for engagement in the card feed mechanism. Magazine slide 103 is formed with a pair of downwardly extending spaced projections 116 having the front end of a slide operating link 117 pivotally secured thereto. Link 117 extends rearwardly from slide 103, as shown in Fig. 4, and has the rear end pivotally connected to the free end of operating arm 118 carried by slide operating rod 119 rotatably mounted at its opposite ends in bearing plates 92. Link 117 and operating arm 118 for magazine slide 103 are located in the central portion of the card feed mechanism between the side plates. A bottom cover 120 is mounted on the bottom portion of base plate 101 of the magazine to prevent access to the lower portion of the magazine so as to prevent an operator from being injured in the operation of the machine to reciprocate slide 103.

The document feed mechanism has a unit drive shaft 121 extending between and beyond side plates 90 and 91 having the end portions rotatably mounted in bearing plates 92. The right-hand end of unit drive shaft 121 carries a gear 122 in mesh with main drive gear 42 as shown in Fig. 3 for rotating unit drive shaft 121 in timed relation with document feed rolls 45 and 46 driven in the manner hereinabove described in the operation of main drive shaft 43 and main drive gear 42.

The left-hand end of unit drive shaft 121, as shown in Figs. 3 and 7, has an eccentric 123 rigidly mounted thereon adjacent the inside face of left-hand bearing plate 92. A slide actuating arm 124 is mounted on the left-hand end of rod 119 adjacent left-hand bearing plate 92 and carries a roller 125 on the free end at one side having rolling engagement with the periphery of eccentric 123, as shown in Fig. 7. A bracket 126 is mounted on slide actuating arm 124 and has a portion extending laterally therefrom and carrying a pin providing an anchor for one end of tension spring 127 having the opposite end secured to tie rod 94 extending across the upper front portion between side plates 90 and 91. A holding pin 128 is mounted on and extends laterally from the opposite side of slide actuating arm 124 from that carrying roller 125 as shown in Fig. 7, and toward the adjacent bearing plate 92 over holding link 129. Holding link 129 is pivoted on the inside face of left-hand bearing plate 92 and has shoulder 130 on the upper edge thereof positioned when link 129 is moved upwardly to engage holding pin 128 and hold slide actuating arm 124 in the dotted line position, shown in Fig. 7, where it is at the outer limit of its movement under operation by eccentric 123 for preventing roller 125 from following the periphery of eccentric 123 and thereby eliminating oscillating movement of arm 124.

The rotation of shaft 121 and eccentric 123 oscillates slide actuating arm 124 and through the oscillation of rod 119, operating arm 118 and slide operating link 117 reciprocates magazine slide 103 back and forth in base plate 101 for feeding one card at a time from the bottom of the magazine for each rearward sliding movement of magazine slide 103 in the magazine.

When holding link 129 engages holding pin 128 to stop the operation of magazine slide 103 and picker knife 105, this will take place at the rear end of the movement of slide 103 after it has delivered a card from the bottom of magazine 100. Holding link 129 is moved into position to engage holding pin 128 by control link 131 having the lower end pivotally connected to the free end of holding link 129 and the upper end pivotally connected to the armature of solenoid 132 mounted on end plate 91 at the upper rear corner. Whenever solenoid 132 is energized control link 131 will operate link 129 to engage holding pin 128 and stop the feed of cards by magazine slide 103.

A pair of document feed rolls 135 and 136 mounted on shafts 137 and 138 respectively, journalled in bearing plates 92 at opposite sides of the unit are arranged in peripheral contact with the contacting portions of the rolls in horizontal alignment in the rear of magazine 100 with the opening between document control finger 112 and control block 114 to receive each document therebetween as it is discharged by the picker knife and slide 103 from the magazine. Fig. 7 shows how the bearing plates 92 are formed to slidably receive the bearings for shaft 138 so that springs mounted in vertically extending bores in the end plates and spring housings indicated at 89 extending upwardly from the upper edges of bearing plates 92 may have the spring tension controlled to resiliently retain feed roll 136 in the desired tensioned engagement with feed roll 135 for efficient feeding cooperation. Shafts 137 and 138 have intermeshing gears 139 and 140 respectively, mounted thereon for rotating the feed rolls 135 and 136 at a uniform speed. Gear 139 on feed roll shaft 137 also meshes with gear 141 on unit drive shaft 121 adjacent the inside face of right-hand bearing plate 92. Feed roll 135 may be of metal while upper feed roll 136 is preferably formed of rubber or some similar friction material that will grip and feed a document as it is delivered from the magazine by the picker knife and slide 103.

A document gripped by feed rolls 135 and 136 is then fed toward the document reversing means over an arcuate guide plate 142 upwardly and to the left as shown in Fig. 4. Guide plate 142 extends transversely between bearing plate 92 and has its ends terminating in spaced relation from said bearing plate as shown in Fig. 3. Arcuate guide plate 142 is supported at opposite end portions by a pair of spaced parallel vertical web plates 143 mounted on transversely extending rods 144 secured in bearing plates 92 at opposite ends, see Figs. 4, 7 and 9.

As the leading edge of a document leaves arcuate guide plate 142 it is fed into engagement with a dual feed roll 145 of suitable friction material such as rubber or the like mounted on dual feed shaft 146 having opposite ends journalled in bearing plates 92 and carrying a gear 147 on the right-hand end thereof, Fig. 6, in mesh with drive gear 141 on unit drive shaft 121.

Primary coacting feed rollers 148 are rotatably mounted in spaced relation on rod 149 carried by a pair of spaced arms 150 suspended from transverse supporting rod 151 for pivotal movement thereon so that the peripheries of rollers 148 will engage a document being fed and hold it in feeding engagement with the periphery of dual feed roll 145. Supporting rod 151 extends transversely between and has opposite ends supported by bearing plates 92 and is positioned above dual feed roll 145, as clearly shown in Fig. 4. The arrangement of primary coacting feed rollers 148 as shown in Fig. 4, is forwardly of dual feed roll 145 so that a document fed therebetween is engaged and fed in an upward rearwardly inclined direction from arcuate guide plate 142 after leaving feed rolls 135 and 136.

A document reversing guide 152 is mounted in transversely extending relation between bearing plates 92 on rod 153 having opposite ends supported by bearing plates 92. As shown in Fig. 3 document reversing guide 152 has the ends terminating in inwardly spaced relation from bearing plates 92, the length thereof being equal to that of arcuate guide plate 142. As the leading edge of a document is fed rearwardly and upwardly by the cooperation of dual feed roll 145 and rollers 148, it will engage the forwardly and upwardly inclined face of reversing guide 152 so that the leading edge will be directed upwardly in the rear of supporting rod 151, as shown in Fig. 4.

An upper guide plate 154 is mounted above and to the rear of reversing guide 152 in inclined relation as shown in Fig. 4 for cooperation with the reversing guide in engaging the leading edge of a document and guiding it upwardly in a vertical direction as it is fed upwardly by dual feed roll 145 in cooperation with primary coacting feed rollers 148. Upper guide plate 154 is provided with a pair of laterally extending ears secured to a pair of spaced supporting arms 155 suspended from a supporting rod 156 mounted in the same horizontal plane with supporting rod 151 rearwardly thereof in spaced parallel relation and having opposite ends supported by bearing plates 92. Rods 151, 153 and 156 are mounted on triangular plates at opposite ends which in turn are secured to bearing plates 92 for support.

The free ends of supporting arms 155 rotatably mount secondary coacting feed rollers 157 adjacent the ends of supporting arms 155 with the peripheries engaged with the periphery of dual feed roll 145 at the rear portion thereof opposite to the engagement of primary coacting feed rollers 148 therewith. A rod 158 extends through supporting arms 155 to rotatably support secondary coacting feed rollers 157 in the same manner as rod 149 supports rollers 148. The free ends of rods 149 and 158 terminate in spaced relation to bearing plates 92 as shown in Fig. 3 and have their ends connected by coil springs 159 for maintaining primary and secondary coacting feed rollers normally engaged with the periphery of dual feed roll 145 so that documents fed between said rollers and the dual feed roll will be firmly and frictionally engaged and fed thereby. The pivotal mounting of supporting arms 150 and 155 on rods 151 and 156 provides for relative movement of primary and secondary coacting feed rollers away from the surface of dual feed roll 145 to accommodate the various thicknesses of documents fed therebetween.

A document fed upwardly by the cooperation of primary feed rollers 148 and dual feed roll 145 will extend upwardly in a vertical direction and be fed upwardly past upper guide plate 154 to engage in gripper heads 160 carried by the free ends of a pair of gripper arms 161 fixed on gripper shaft 162 in spaced parallel relation extending transversely between and journalled in bearing plates 92 at the forward upper ends. Each gripper head is formed with a slot 163 opening at the lower end of the head through a V-shaped mouth portion 164 so that the leading edge of a document 109 fed upwardly by rollers 148 and dual feed roll 145 will be guided into mouth portions 164 and up into slots 163 in the pair of gripper heads 160 as shown in Fig. 4. A gripper disc 165 is rotatably mounted on gripper head 160 with the periphery arranged in substantially tangential relation with one side of slot 163 at the juncture thereof with the inner end of V-shaped mouth portion 164. Another gripper disc 166 is rotatably mounted on the free end of arm 167 pivoted at 168 on gripper head 160 adjacent the juncture with gripper arm 161 in a position where the periphery of gripper disc 166 can be engaged with the periphery of gripper disc 165 across slot portion 163 at the juncture with mouth portion 164, as shown in Fig. 4. A tension spring 169 is connected with the free end of arm 167 and gripper arm 161 for normally moving arm 167 about pivot 168 so that the periphery of gripper disc 166 will be moved toward gripper disc 165. This provides a structure wherein a document 109 fed into slot 163 of gripper head 160 as shown in Fig. 4, will separate gripper disc 166 from disc 165 and by the resilient operation of arm 167 by spring 169 the gripper disc will be operated so that the card will be frictionally retained in gripper head 160.

Gripper shaft 162 carries eccentric arm 170 rigidly mounted thereon at the right-hand end with the free end pivotally connected to connecting arm 171 having the opposite end provided with a roller bearing mounting on eccentric 172 mounted on unit drive shaft 121 at the right-hand end thereof adjacent gear 141. Eccentric 172 is positioned on unit drive shaft 121 at a predetermined fixed angle relative to eccentric 123 so that when a document is fed from the magazine gripper heads 160 it will be moved down toward dual feed roll 145 to its lower limit of movement by the operation of eccentric 172 and connecting rod 171 and then begin upward movement to the position indicated in Fig. 4 when a fed document 109 will have been moved by feed rolls 135 and 136 across arcuate guide plate 142 and fed upwardly by dual feed roll 145 and primary coacting rollers 146 to engage in the gripper heads in the position shown in Fig. 4 where the upper edge of the document reaches the upper end of slots 163 in the gripper heads. In further operation of this card feed and reversing device gripper arms 161 move upwardly at a rate of speed equal to the feed of dual feed roll 145 until the trailing edge of the document engaged in gripper heads 160 is above the position shown in Fig. 4 and where it disengages from primary rollers 146 and dual feed roll 145. In further operation of this card feed and reversing mechanism gripper arms 161 move upwardly to the dot and dash line position indicated by the numeral 173. When gripper arms 161 are moved upwardly to the position indicated by center line 173, the trailing edge of a document 109 will have been moved above document reversing guide 152. In the upward feeding of a document to the position shown in Fig. 4, illustrating a document 109 engaged in gripper heads 160, it will be noted that the document is flexed out of its normal flat condition and also that when the gripper heads reach a position where the center line for gripper arms 161 is along the center line 173, the slots 163 in gripper heads 160 will be directed into an angular position facing downwardly and rearwardly. As soon as the trailing edge of the document held by the gripper heads moves above document reversing guide 152, this trailing edge will move rearwardly across and above document reversing guide 152 into an angular position about equal to the angle of upper guide plate 154. The trailing or lower edge of the document will engage guide plate 154 when gripper arms 161 are in the uppermost position. This reverses the document 109 in the feed mechanism so that in subsequent feeding operation the face of the document that was at the bottom in magazine 100 will be on the top or outer side in further feeding thereof through the machine for photographing of the face of the document originally located in downwardly facing relation in magazine 100.

When gripper heads 160 begin moving downwardly from the upper position indicated by center line 173, the lower edge of the held document becomes the leading edge. This lower leading edge is fed downwardly between upper guide plate 154 and reversing guide 152. The document reversing guide 152 is formed at the upper and left-hand portion, as shown in Fig. 4, to incline downwardly and rearwardly above rod 153. Should the leading edge of the document in the downward movement curve forwardly to any extent resulting from the previous feeding operation, it will be held in such a position that it will engage the downwardly and rearwardly inclined upper face of reversing guide 152 and be directed thereby downwardly and rearwardly to the rear peripheral portion of dual feed roll 145 for engaging between this dual feed roll and secondary coacting feed rollers 157. Secondary coacting feed rollers 157 and dual feed roll 145 will then firmly grip opposite faces of the leading edge of the document and feed the document downwardly at a more rapid rate than the downward movement of gripper arms 161 when they approach the lower limit of movement to pull the document out of engagement from between gripper discs 165 and 166 and out of slot 163 to disengage the document from gripper heads 160.

The leading edge of the document will be guided by rear arcuate guide plate 174 mounted on the rear ends of vertical spaced parallel web plates 143, as clearly shown in Fig. 4. Rear arcuate guide plate 174 is positioned to direct the leading edge of the document downwardly and rearwardly between the first pair of document feed rolls 45 and 48 as clearly shown in Fig. 4 so that these feed rolls 45 and 48 will grip and feed the document about the cylindrical path through photographing position 49. The lower rear edge of rear arcuate guide plate 154 terminates in adjacent relation to the normally contacting portions of the first pair of rollers 45 and 48, as shown in Fig. 4.

After the documents are fed through the photographing position they are delivered by the pairs of feed rolls 45 and 48 to the receiving member where they are stacked in the same order in which they were fed from the magazine. As the leading edge of a document leaves the bottom pair of feed rolls 45 and 48 it engages a transversely extending arcuate guide plate 180 for guiding the leading edge into the receiving member feed rolls 181 and 182. Receiving member feed rolls 181 and 182 are mounted on feed roll shafts 183 and 184 respectively, journalled at opposite ends in a pair of receiving member bearing plates 185. Receiving member bearing plates 185 are secured by screws or the like in spaced parallel relation to the inner faces of end plates 186 of the document feed unit rotatably mounting document feed rolls 45. The forward lower portion of these end plates are provided with a projecting portion mounted on transverse supporting rod 187 also engaging in the front central portions of receiving member bearing plates 185 mounted at opposite ends on side walls 3 and 4. Brackets 188 on the opposite ends of arcuate guide plate 180 are secured to the inner faces of bearing plates 185 and mount the arcuate guide plate in position.

End plates 186 are of generally circular form and mounted in spaced parallel relation inside side walls 3 and 4 and are formed with journals for receiving the shafts carrying feed rolls 45 so as to rotatably mount the feed rolls in the end plates. These end plates are secured together in spaced parallel relation by a plurality of tie rods 186'.

Feed roll shaft 184 extends through receiving member bearing plates 185 at the right-hand side of the machine and right-hand end plate 186 and carries a pinion 189 on the outer right-hand end having intermeshing engagement with internal ring gear 44. Feed roll shaft 184 has another similar pinion 190 fixed thereon at the inner face of the right-hand bearing plate 185 as shown in Fig. 6, intermeshed with a correspondingly sized pinion 191 on feed roll shaft 183 operating to drive feed rolls 181 and 182 at the same surface speed.

The journals for feed roll shaft 183 are mounted so that shaft 183 can move toward and from feed roll shaft 184. Bearing plates 185 carry spring housings 192, one on each bearing plate arranged in radial relation to feed roll shaft 183 at the lower front edge of each plate in the plane passing through the centers of shafts 183 and 184 as shown in Fig. 6. Coil springs are housed in spring housings 192 and have set screws 193 for adjusting the compression thereof in the spring housings. These coil springs are adapted to engage the bearings for the ends of feed roll shafts 183 mounted in slots in plates 185 to normally and resiliently maintain the periphery of feed roll 181 in contact with feed roll 182 when no documents are being fed therebetween and to grip documents between feed rolls 181 and 182 under the resilient pressure exerted by the springs in spring housings 192 for positively feeding the documents into the receiving member.

The central portion of arcuate guide plate 189 is provided with a plurality of slots shown in dotted lines at 194 in Fig. 11. A document actuated control plate 195 is mounted on control shaft 196 extending transversely between and journalled in end plates 186 and side wall 4. Document control plate 195 has a plurality of fingers projecting laterally from shaft 196 as shown in Fig. 11, aligned with slots 194 and normally adapted to project through slots 194 whenever documents are not being fed over arcuate guide plate 180. A tension spring 197 secured at one end to the right-hand receiving member bearing plate 185 and at the other end to the free end of arm 198 projecting radially from and fixed on control shaft 196 at the right-hand end portion thereof normally moves the fingers on plate 195 into slots 194. Whenever a document 109 passes over arcuate guide plate 180 it engages the fingers on control plate 195 and rotates shaft 196 in a counter-clockwise direction as shown in Fig. 4 so that the free ends of the fingers on control plate 195 will ride over the inner upper face of the documents as they pass thereunder. This position of control plate 195, control shaft 196 and arm 198 is illustrated in Figs. 4 and 11. A switch actuating arm 199 mounted on and extending radially from the left-hand end of control shaft 196 as shown in Fig. 11, is held out of contact with micro-switch 200 mounted on the inner face of side wall 4 when control shaft 196 is document actuated so that a control circuit including switch 200 is opened as long as control plate 195 is held in the position shown in Fig. 4 by a document. Whenever documents fail to engage and hold control plate 195 in the position shown in Fig. 4, spring 197 will actuate control shaft 196 to extend the fingers through slots 194 and operate switch actuating arm 199 to engage and close micro-switch 200 for energizing the control circuit including this switch. A lever 201 is mounted on and extends radially from control shaft 196 at the left-hand end thereof adjacent side wall 4 as shown in Figs. 8 and 11 for engagement and operation by the laterally extending projection on slide bar 202. Slide bar 202 has a bifurcated end slidably engaged over shaft 196 with the opposite end portion formed with a slot slidably engaged and retained on stud 203. Slide bar 202 projects upwardly and forwardly from control shaft 196 in inclined relation as shown in Fig. 8. A coil spring 204 has one end secured to the upper end of slide bar 202 and the opposite end of a stud 205 and is normally tensioned to hold slide bar 202 at its upper limit of sliding movement to avoid interference with the operation of control shaft 196 by spring 197 to close micro-switch 200.

When a document is gripped and fed by receiving member feed rolls 181 and 182 it is moved upwardly into the tray portion of the receiving member for stacking in tray 210. Document tray 210 is formed of sheet metal or the like to provide a bottom 211, a front end wall 212 and side walls 213 while the rear end of the tray is open for receiving documents fed therein by receiving member feed rolls 181 and 182. Tray bottom 211 is arranged in substantially horizontal relation and mounted upon a shelf member 214 carried by the front of the casing for the machine as shown in Fig. 4.

A pair of longitudinally extending spaced parallel track bars 215 are mounted on the upper face of tray bottom 211 as shown in Figs. 4 and 11, and extend from front wall 212 beyond the rear end of bottom 211. The portion of track bars 215 extending beyond the rear end of bottom 211 have the lower rear ends removed to provide projections 216 seated in notches formed in transverse supporting rod 187 at the upper portion of the periphery thereof with the free ends of projections 216 extending into annular grooves 217 formed in feed roll 181. The free ends of projections 216 of track bars 215 terminate in annular grooves 217 in feed roll 181 in rounded end portions having the upper surface of track bars 215 tangential to the periphery of feed roll 181 with the curved ends of the projections 216 providing for the curving of the top surface of the track bars to a position below the periphery of feed roll 181 in order that the edges of documents engaging the periphery of feed roll 181 can be moved onto the top surface of track bars 215 without obstruction. Securing plates 218 are detachably secured to tray bottom 211 at the rear end for engagement with the under portion of supporting rod 187 to hold the rear end of tray 210 in cooperation with projections 216 on supporting rod 187. A latch indicated at 219 is pivoted on the tray bottom 211 at the front end and engages in the slotted end of a post extending upwardly from shelf member 214 through an opening in the tray bottom for detachably securing the tray in operative position.

A follower 220 is slidably mounted on track bars 215. Follower 220 has a base plate 221 carrying brackets 222 on the lower face thereof in spaced parallel transversely extending relation with depending end portions on opposite ends slidably engaging against the outside edges of track bars 215 as shown in dotted lines in Fig. 11. Supporting and guide pins 223 are mounted in the depending ends of brackets 222 in inwardly extending relation for engagement in channels 224 extending inwardly from the outer side edges of track bars 215 as shown in Fig. 5. Brackets 222 and guide pins 223 support follower 220 for longitudinal sliding movement in the tray on track bars 215. Follower 220 has a follower plate 225 extending in vertical relation at the rear edge of base plate 221 and a web section 226 connecting the front face of follower plate 225 with base plate 221.

A pin 227 is mounted in the central portion of base plate 221 and projects downwardly from the rear end portion thereof and at the lower end is formed with an annular groove to receive a clip 228 in detachable relation in the groove. Clip 228 is carried by one end of a flexible strip 229 having the opposite end connected to and adapted to be wound upon drum 230 rotatably mounted in brackets 231 carried by the bottom rear portion of bottom wall 211 of the tray. The rear end of bottom 211 is slotted so that the top portion of the periphery of drum 230 can project through the slot in order that flexible strip 229 will be supported by the drum and pin 227 in spaced relation above the upper face of bottom 211. A spiral spring 232 is mounted in and normally actuates drum 230 to wind flexible strip 229 thereon by rotation of the drum in the direction of the arrow as shown in Fig. 4. This normally moves follower 220 rearwardly in tray 210.

A stacking roll 233 is mounted above receiving member feed rolls 181 and 182 in transversely extending relation about mid-way of the position stacked documents will take in tray 210. Stacking roll 233 determines the position of the documents in the rear end of the tray under compression by follower 220 actuated by spring drum 230. Stacking roll 233 is mounted on shaft 234 having the ends journalled in bearing plates 185 and at the right-hand side of the machine shaft 234 extends through right-hand bearing plate 185 and end plate 186 and carries a pinion 235 on the right-hand end thereof intermeshed with internal gear 44.

A stacking member includes a top plate 236 to provide a closure for the top rear end of the tray having the forward end secured to the rear end of bottom cover plate 126, as shown in Fig. 4. The rear end of top plate 236 is supported by brackets 237 mounted on rod 238 extending transversely between and having opposite ends secured to web plates 143. Brackets 237 are mounted on the rear corner portions of top plate 236 and are positioned against the inside of web plates 143 as shown in Fig. 9. A pair of stacking bars 240 are arranged in spaced parallel longitudinally extending relation and secured to the under side at the rear end of top plate 236. The forward ends of stacking bars 240 are rounded from the bottom face to the top portion thereof so that the top edges of documents engaged with the stacking bars can gradually move forwardly during the stacking of documents in the tray about the rounded forward ends until the documents are in a fully upright position as shown in Fig. 4. A rear guard plate 241 of angle form in cross-section is mounted on the rear ends of stacking bars 240 above stacking roll 233 with one portion of the plate extending in vertical relation having the forward face substantially tangential with the periphery of stacking roll 233. The lower edge of the vertically extending portion of rear guard plate 241 is curved rearwardly and terminates in close adjacent but spaced relation to the periphery of stacking roll 233 as shown in Fig. 4. This provides means for guiding the leading edge of a card into the receiving member for stacking therein and preventing the leading edge from extending rearwardly in the machine. Rear guard plate 241 guides the leading edge of a document upwardly as it is fed by receiving member feed rolls 181 and 182 into engagement with stacking bars 240 with stacking roll 233 cooperating in moving a document entering the receiving member up against the stacking bars.

A document guide plate 242 is mounted in transversely extending relation between stacking roll 233 and feed roll 182 for cooperation in guiding documents being fed into the receiving member by feed rolls 181 and 182 upwardly and forwardly of stacking roll 233 in the manner illustrated in Fig. 4. Document guide plate 242 has lateral extensions at its ends secured to a pair of cooperating guide plates 243 arranged in spaced parallel relation perpendicular to the axes of stacking roll 233 and feed roll 182. Guide plates 243 are mounted on a pair of spaced parallel supporting rods 244 having opposite ends mounted in bearing plates 185 and end plates 186. A pair of spaced parallel rods 244' connect the rear edges of guide plates 243. The forward edges of cooperating guide plates 243 are formed to provide arcuate recesses for engaging in annular grooves 245 and 246 respectively, formed in stacking roll 233 and feed roll 182, respectively.

As cards are fed one behind another in the rear end of document tray 210 by the cooperation of receiving member feed rolls 181 and 182 and stacking roll 233 in cooperation with rear guide plate 241 and stacking bars 240, follower 220 is gradually moved forwardly in tray 210 against the tension of spring 232 in spring drum 230. As the tray becomes filled, a circuit closing contact 248 mounted on the bottom right-hand forward portion of base plate 221 of the follower will engage a pair of contacts 249 mounted in an insulating block 250 for closing a control circuit. A guard member 251 is mounted in the front end of the tray and has a portion extending over contacts 249 to protect them against accidental closure of the circuit therethrough by other means than circuit closing contact 248.

A holding dog 252 is pivotally mounted on web section 226 of follower 220 and has a lateral extension forming a handle portion for rotating the dog. The opposite end of holding dog 252 extends downwardly and rearwardly through a slot in base plate 221 and slides along the upper face of bottom 211 in the normal movement of follower 220 back and forth in the tray. When the tray has become filled with documents to the point where circuit closing contact 248 engages contact 249 and closes the circuit therethrough, holding dog 252 will have the lower end sliding on the top of bottom 211 in the rear of slot 253 in bottom 211. However, by manual movement of follower 220 forwardly to a slight additional extent the rear lower end of dog 252 will drop into slot 253 and hold follower 220 at the front end of the tray against slidable movement by the operation of spring drum 230. This provides a convenient means for removing the documents from the tray after it has become filled.

The wiring connections for the machine are shown in the wiring diagram Fig. 14. A pair of main circuit wires indicated by numerals 254 and 255 are connected to a suitable source of current supply through fuse block 256 mounted in the machine at a suitable point, not shown. A main switch 257 is mounted at the upper right-hand front corner of side wall 3 and controls the circuit to the current supply through wire 254. A pair of main circuit wires 258 and 259 are connected to main switch 257 and to fuse block 256 in circuit with supply wire 255 so that current may be supplied for operating the various parts of the machine under the control of main switch 257.

Motor 6 is provided with circuit connections as shown in Fig. 13 from the opposite terminals thereof to wires 258 and 259. Thus, when switch 257 is closed motor 6 is connected to the source of current supply through fuse block 256 for continuous operation while the switch is closed. The lamps in lamp housing 59 for illuminating documents during the photographing operation are indicated at 260 in Fig. 13, as connected in parallel to wires 261 and 262. Wire 261 is connected to micro-switch 65. Switch 65 is connected by wire 263. Wires 262 and 263 are connected to opposite out-put terminals of stabilizer 264. The in-put terminals of stabilizer 264 are connected by a pair of wires 265 to main circuit wires 258 and 259 respectively, so that lamps 260 will be placed in circuit with a source of current supply through main switch 257 and under the control of micro-switch 65. Stabilizer 264 is of conventional form for stabilizing the voltage to lamps 260 to prevent overload and damage to the filaments in the lamps. A resistance 266 of high value is connected across micro-switch 65 between wires 261 and 263 for protecting lamps 260 from high voltages created by the discharge arc when switch 65 is opened. The resistance 266 is of such value that current from the supply circuit will not flow therethrough to a sufficient extent to illuminate lamps 260.

A current transformer is indicated at 267 having the primary connected to main circuit wires 258 and 259, as shown in Fig. 13. The secondary of transformer 267 is a low voltage winding having one end connected by wire 268 to one terminal of each of the control switch contacts in the camera indicated by the numerals 21, 26 and 27 respectively, one of the contacts 249, lead strip contact 29, camera operated contact 32 and one terminal of micro-switch 200. The other terminal of the secondary for transformer 267 is connected by wire 269 to switch operating solenoid 270. The opposite terminal of solenoid 270 is connected by wire 271 to the other contact of micro-switch 200, the other contact 249, lead strip contact 30, then through buzzer 272 to contact 33, contact 30 and stationary contacts 22, 25 and 28 respectively. It will therefore be seen from Fig. 13 that the several switches are included in parallel for each independently closing the circuit to solenoid 270 while the switches in the camera, and contacts 32 and 33 operated by the camera will in addition control buzzer 272 so that when any one of these circuits is closed solenoid 270 will not only be energized but buzzer 272 will be energized to give an audible signal.

A control plate 273, Fig. 8, is mounted on the upper front corner of side wall 4 of the left-hand side of the machine and has an inclined upper edge with a push-button guide panel 274 mounted in inclined laterally extending relation along said inclined upper edge. Switch operating solenoid 270 is mounted on a bracket 275 secured to control plate 273 in inclined relation under the central portion of guide panel 274 as shown in Fig. 8. A contact supporting bracket 276 having offset ends is mounted with one end secured to bracket 275 under solenoid 270 and the opposite end offset above the free end of solenoid 270 at the rear side thereof for supporting a pair of contact arms 277 and 278 in insulated relation. Contact arm 277 has a wire connection 279 as shown in Fig. 13 with one terminal of solenoid 132 while the other terminal of solenoid 132 is connected by wire 280 to main supply wire 258. Contact arm 278 is connected by wire 281 to main supply wire 259 so that the circuit to solenoid 132 is closed to energize the solenoid whenever the contacts on arms 277 and 278 are engaged. Wires 279 and 281 are also connected to opposite terminals of micro-control switch 64 in parallel with contact arms 277 and 278 as shown in Fig. 13 in order that solenoid 132 will be energized whenever frame 57 is moved out of the full line position shown in Fig. 1 into the dotted line position where the lamps in lamp housing 59 would not operate to illuminate documents for the photographing operation. A pilot light 282 shown in Fig. 13 is connected in circuit with wire 279 and main circuit wire 258 so as to be in circuit for energization whenever either micro-switch 64 is closed or contacts 277 and 278 are engaged. This pilot light will indicate to the machine operator that solenoid 132 is energized and in operation in the control of the machine.

Solenoid 270 has an armature 283 pivoted at one end on bracket 276 as shown in Fig. 8 with tension spring 284 connected to the armature and bracket 276 for normally moving the armature away from the free end of solenoid 270. The free end of armature 283 carries an operating link 285 connected with contact arm 277 for moving contact arm 277 to bring the contact point thereon into engagement with the contact point on arm 278 to close the circuit through said contact arms whenever armature 283 is moved toward the end of solenoid 270 by the energization of the solenoid through closing the circuit thereto. Spring 284 normally moves the armature away from the solenoid when it is deenergized so that the circuit through contacts 277 and 278 will be opened. Armature 283 is also provided with a latch projection 286 extending from the free end thereof for engagement with a pivoted latch 287 pivotally mounted on stud 288 projecting inwardly from control plate 273. Latch 287 is of bell crank shape having a shoulder 289 on the free end for engaging latch projection 286 in a position where contacts 277 and 278 will be held engaged for closing the circuit therethrough. The other arm of latch 287 extends forwardly in downwardly inclined relation from stud 288 and has spring 290 secured to the free end and to stud 205 carried by control plate 273. Spring 204 also secured to stud 205 is spaced from spring 290 in a position closer to control plate 273 than spring 290. Latch 287 is also mounted on stud 288 at a greater distance from control plate 273 than slide bar 202 which slides against the face of control plate 273. When latch 287 is moved in a counter-clockwise direction on stud 288 sufficiently to disengage latch projection 289 on armature 283, the armature will move upwardly to a position where contacts 277 and 278 will become disengaged in which position the armature will engage stop member 291 mounted on bracket 276. Stop member 291 limits the movement of armature 283 away from solenoid 270 so that the free end of latch projection 286 will be held in a position to engage the end of projection 289 and hold latch member 287 in a position rotated counter-clockwise from that shown in Fig. 8 with spring 290 tensioned to move latch member 287 back into the position shown in Fig. 8.

Three push-button control slides 292, 293 and 294 provide manual operating control members for controlling operation of the machine after control switch 257 is closed.

Push-button control slide 292 is slidably mounted in the forward portion of push-button guide panel 274 having the upper end extending above said panel and provided with a push-button on the free end thereof for manual engagement by the operator. Below guide panel 274 push-button slide 292 is slotted to engage over guide stud 295 on control panel 273 thereby providing for the slidable mounting of push-button control slide 292 with the lower end thereof having an operating pin 296 mounted thereon in laterally projecting relation and aligned to engage and operate slide bar 202 and latch 287 simultaneously whenever slide bar 292 is depressed or moved downwardly, as illustrated in Fig. 8. Pivoted latch 287 has a projection 297 having the end terminating in the same position as the end of slide 202 so that the ends are in aligned relation to be simultaneously engaged by different portions of operating pin 296 when slide 292 is depressed. Tension spring 298 is connected to stud 299 on push-button control slide 292 at one end and to guide panel 274 at the opposite end for normally moving slide 292 to its upper limit of movement into an inoperative position.

Control slide 292 forms a starting means that is manually actuated for starting the feeding and photographing of documents in the machine.

When it is desired to photograph a plurality of documents of uniform size, magazine 100 is provided with a supply of documents having the face that is desired to be photographed facing downwardly. The operator closes main switch 257 starting motor 6 and as no documents have been fed through the machine and are stacked in tray 210, follower 220 will have follower plate 225 slidably moved into the rear position where follower plate 225 will engage the periphery of stacking roll 233 through the operation of the spring drum holding the follower in the rearmost position under resilient tension. The starting of motor 6 will start and rotate all of the feed rolls in the machine from main drive gear 42. That is, main drive gear 42 through the several gear connections hereinbefore described will rotate feed rolls 45, document feed rolls 135 and 136, dual feed roll 145, receiving member feed rolls 181 and 182 and stacking roll 233. These rolls will all be continuously rotated as long as switch 257 remains closed.

When the machine is empty the lack of cards passing over transversely extending arcuate guide plate 180 allows coil spring 197 to rotate control shaft 196 in a clockwise direction, as shown in Fig. 4, so that the fingers on card actuating control plate 195 extend through slots 194. This operates switch actuating arm 198 so that micro-switch 200 is moved into closed position energizing switch operating solenoid 270 and thereby pulling armature 283 toward the solenoid to establish circuit between contacts 277 and 278 to close the circuit to solenoid 132 for operating control link 131 which moves holding link 129 into position to engage holding pin 128 thereby holding the picker knife from reciprocating movement to feed cards from the bottom of the magazine. As a result the machine will operate without feeding cards. Main shaft 43 will be rotated and unit drive shaft 121 will also be rotated so that all of the mechanism operated thereby will be placed in motion so long as motor 6 is running. This includes oscillation of gripper heads 160 and gripper arms 161.

With the parts arranged in this position and the magazine filled with cards, the lamp housing frame must be in the proper position to hold micro-switch 64 open otherwise it will not be possible to start the feed of documents for photographing. Likewise, the camera must be provided with film with the various contact arms properly set to hold the contacts controlled thereby so that the circuits will be open. It is customary in using the present machine to close switch 257 and then to raise cover 13 at the rear of the casing into open position. A camera properly loaded with film is then placed in proper position in the rear of the machine where it is latched rigidly into position to hold camera contacts 32 and 33 in disengaged relation to open the circuit controlled thereby. Rear cover 13 is then moved into closed position for starting the operation of the lead strip feed 10. This will close contacts 29 and 30 for closing the circuit to switch operating solenoid 270 for preventing the feed of documents into the machine until the lead strip has been completely fed and these contacts are again opened at the end of the operation.

When this condition in the machine is reached the starting means may be manually actuated by depressing push-button control slide 292 downwardly. This will cause pin 296 to engage projection 297 and the upper end of slide bar 202 and move the same downwardly. Pivoted latch 287 will be rotated in a counter-clockwise direction to disengage from latch projection 286 so that armature 283 will move away from the solenoid through the operation of spring 284 for disengaging the contact arms 277 and 278 thereby deenergizing solenoid 132. At the same time the operation of slide 202 engages the projection on the lower end thereof with lever 201 and rotates control shaft 196 in a clockwise direction as shown in Fig. 8 to disengage arm 199 from micro-switch 200 so that the circuit to solenoid 132 is opened at micro-switch 200. Depression of starting slide 292 also causes pin 299 to engage detent operating arm 300 and rotate it in a counter-clockwise direction for moving detent 301 out of engagement with pin 302 mounted on the upper end and extending laterally from control link 131 thereby releasing link 131 so that it may move downwardly and disengage shoulder 130 from holding pin 128 by the operation of holding link 129 to move it into the position shown in full lines in Fig. 7. The operation of these parts in this manner will then release magazine slide 103 for reciprocation in the rotation of eccentric 123. Documents will then be fed one at a time from the bottom of magazine 100 through the feed means for photographing. A coil spring 303 having one end secured to guide panel 274 and the opposite end secured to the free end of detent operating arm 300 normally actuates the detent in a clockwise direction for moving the end into a position to engage pin 302 whenever solenoid 132 is energized for stopping the feed of documents from the magazine and preventing the starting of the feed of documents until the starting means is manually actuated by depressing push-button control slide 292.

When a document is fed by magazine slide 103 through the operation of picker knife 105 on the rear edge thereof about half way out of the bottom of the magazine the leading edge will be engaged between feed rolls 135 and 136 which operate at a higher speed than feed rolls 45 and 46 respectively, in timed relation with the movement of gripper heads 160 and at the same speed as dual feed roll 145 so as to feed the first card or document 109 into the gripper heads in the manner shown in Fig. 4. The gripper heads then rapidly raise the cards until the trailing edge is above document reversing guide 152 when its position of feed becomes reversed and the bottom edge becomes the leading edge subsequently fed between dual feed roll 145 and feed rollers 157 which pick the card out of the gripper heads and feed it into feed rolls 45 and 46.

The parts are shown in Fig. 4 in an intermediate position of operation. The position of the parts illustrated shows the position which they occupy when the trailing edge of a card is leaving dual feed roll 145 and feed rollers 157 after having been engaged in feed rolls 45 and 48 for further feeding through photographing position 49. The documents are fed up to this point more rapidly than they are fed by feed rolls 45 and 48 due to the fact that each document must be reversed before a succeeding document is fed into position to engage in gripper heads 160. With the parts positioned in Fig. 4 it will be seen that in further rotation of unit drive shaft 121 as shown in Fig. 7 magazine slide 103 will move forwardly a small amount to its forward limit of movement while gripper heads 160 and gripper arms 161 are moved to the upper limit of movement for reversing the card or document 109 engaged therein. As the direction of feed of the card engaged in the gripper heads is reversed, magazine slide 103 will start the feed of another document from the magazine. The rapidity of the feed in this part of the document feed means will feed documents so that the leading edge of a document when it engages in feed rolls 45 and 48 will be positioned closely behind the trailing edge of a preceding document as shown in Fig. 4. In a full sized machine this space is controlled to be about one-quarter inch. It will thus be seen that the documents upon engagement in feed rolls 45 and 48 have their leading and trailing edges substantially close together in order that substantial continuous operation of feed rolls 45 will continuously feed documents through the photographing position to maintain continuous operation of the lights, the camera and film feed for continuously photographing documents on the film. This construction is operated to obtain this continuous photographing of documents in order to rapidly photograph large numbers of documents. The operator continues to feed stacks of documents into magazine 100 before documents previously placed in the magazine are completely fed therefrom. In this way thousands of cards can be continuously fed by keeping the magazine at least partly filled with documents for photographing.

When the machine is started it is necessary to manually hold push-button control slide 292 in the depressed position until the first document fed has been moved through the photographing position 49 and fed into engagement with arcuate guide plate 180 at the entrance to the receiving member so that it will engage the fingers on card actuated control plate 195 and maintain the operation of control shaft 196 to hold arm 199 in a position where it will not engage micro-switch 200 so that the circuit through this micro-switch will remain open. When this condition has been reached manual operation of push-button control slide 292 can be released and the machine will automatically continue to operate so long as documents are fed in successive order by the feed means through the photographing position with the leading and trailing edges of successive documents in close adjacent relation.

As the first document passes over arcuate guide plate 180 and engages in receiving member feed rolls 181 and 182 operating at the same speed as feed rolls 45, the leading edge of the document will be fed up into the receiving member and guided by follower plate 225 into engagement with stacking bars 240. The distance between stacking bars 240 and the upper edges of track bars 215 is less than the distance between the leading and trailing edges of the document. Stacking roll 233 engages the document and being slightly larger in diameter the feed of the card is increased slightly as the leading edge approaches stacking bars 240. When the leading edge engages stacking bars 240 the trailing edge will then be in a position by reason of the flexing of the document so that it will become disengaged from between feed rolls 181 and 182. At this point the trailing or bottom edge of the document will engage the periphery of feed roll 181 and immediately be further flexed thereby to the right as shown in Fig. 4 to move onto the upper surfaces of track bars 215. This operation is very rapid. It is sufficiently rapid that the trailing edge of a document fed into the receiving member against stacking bars 240 has the bottom edge fed onto track bars 215 before the leading edge of the following document can be gripped and moved toward the receiving member to a sufficient extent to interfere with the stacking of the preceding document. In this way each successive document is fed into the receiving member against stacking bars 240 in the rear of the preceding document and thereby successively fed in the order in which the documents are fed from magazine 100 with the faces of the documents that were photographed still facing in the same direction in the stack that they occupied when placed in magazine 100.

As documents are successively fed in tray 210 forming the receiving member follower 220 is moved forwardly or to the right as shown in Fig. 4 against the tension of spring 232 in spring drum 230. The documents remain flexed while engaged with stacking bars 240 and as the documents stacked in the tray against follower plate 225 increase in number the upper ends move beyond the ends of stacking bars 240 and gradually straighten out as they leave the ends of the stacking bars so that they are arranged in a vertical position against follower plate 225 as shown in Fig. 4.

In the continued automatic operation of the machine the operator feeds documents into the magazine 100 and as fast as the tray becomes partially filled removes groups of fed documents from adjacent follower 220 before the tray is filled. In this way the machine can be kept in continuous automatic operation until the film in the camera is exhausted, breaks or something happens in the card feed in the machine to delay the feed of a card sufficiently long for card actuated control plate 195 to be operated to close micro-switch 200. It will therefore be seen that if the film breaks solenoid 132 is energized by contact 24 being closed. This results in completing the circuit to buzzer 272 and solenoid 270 operating contact arms 277 and 278 to close the circuit thereto. The same thing happens when the film on the supply spool is exhausted by having the circuit closed through contacts 21 and 22. When the receiving spool is filled with film contacts 27 and 28 are closed producing a similar operation.

If the operator allows tray 210 to become filled with documents tray contacts 249 are closed to energize solenoid 132 through energization of switch operating solenoid 270.

It will be noted however that when tray contacts 249 have the circuits closed therethrough and when micro-switch 200 is operated to close the circuit therethrough the buzzer will not be included in the circuit with switch operating solenoid 270 and therefore will not operate. The buzzer will not be operated by the lead strip feed when contacts 29 and 30 are closed. In all cases however pilot light 282 will be energized when solenoid 132 is operated to stop the operation of magazine slide 103.

In the event several control switches are actuated to close the circuit for energizing solenoid 132 it will be noted that this operation only stops the operation of magazine slide 103. Any documents that have had the leading edge fed into engagement with feed rolls 135 and 136 will thereafter be continuously fed through the continuous operation of the document reversing mechanism and feed rolls 45 and the remainder of the machine so that the documents in the course of being fed through the machine for photographing will be completely fed through the machine, photographed and stacked in the receiving member in tray 210. By this operation and control of the document feed the operator always knows which documents have been photographed and which have not. Further, it enables the clearing of the machine of documents at any time that the operator desires by allowing the documents in magazine 100 to become exhausted. Whenever this happens the last document to be fed will be photographed and stacked in the receiving member after which control shaft 196 will be operated by spring 197 to close micro-switch 200 and energize solenoid 132.

The operator may manually stop the feed and photographing of documents at any time desired without allowing the documents in the magazine to become exhausted. This operation is secured by depressing push-button slide 293 slidably mounted in guide panel 274 at the upper end and on stud 304 carried by control plate 273. A spring 305 having one end secured to guide panel 274 and the opposite end secured to the lower end portion of control slide 293 normally holds the control slide at its upper limit of movement. A laterally extending operating pin 306 is mounted on the lower end of control slide 293 in a position to engage armature 283 for moving it toward solenoid 270 to thereby manually operate the armature to close the circuit through contacts 277 and 278 for thereby energizing solenoid 132. The feeding and photographing of cards may again be started by operating starting means through depressing push-button control slide 292 in the manner hereinabove described.

Where it is desired to have the photographic images of one set of documents photographed on the film spaced from the starting of the photographic images of another set of documents on the film so that the film can be separated or to provide a space on the film between the photographing of two sets of documents, this may be obtained by providing for the feed of the film independently of the feed of documents. Therefore, after the photographing of a group of documents has been completed in the machine and the last document fed from magazine 100 the feed will be automatically stopped in the manner above described. A new set of documents may be placed in the magazine ready for feeding but before the starting button of push-button control slide 292 is operated, the operator may manually depress push-button control slide 294 having the upper end slidably mounted in guide panel 274 and the lower end slotted to slidably engage over stud 307 on side wall 4. The lower end of push-button control slide 294 has an operating arm 308 formed thereon positioned for engagement when push-button slide 294 is depressed as shown in Fig. 8 with the projecting end portion on light control lever 69 for moving the lever on its pivot to operate micro-switch 65 to close the circuit through lamps 260 and also for operating pawl 54 to disengage the end from clutch control ring 53'. This provides for the engagement of the clutch for feeding film in the camera as long as push-button control slide 294 is held in a depressed position. Whenever the desired amount of film is fed by this operation and push-button control slide 294 is released and returned to an upper inoperative position by coil spring 309 secured at one end to slide 294 and at the opposite end to guide panel 274, the machine is then ready to again start the feed and photographing of documents through manual operation of the starting means by depressing push-button control slide 292.

A machine constructed in accordance with the present invention will photograph documents at speed greater than three hundred documents per minute. The construction, operation and control of the machine is such that the automatic control will stop operation of the machine whenever the film breaks or is exhausted and when the receiving spool is filled. Should the operator forget to put a camera in the machine when desiring to start the photographing of documents the automatic controls will prevent the manual starting of the machine by operating push-button control bar 292 because all of the control switches for energizing solenoid 270 and solenoid 132 are automatically operable independent of the manual control means to prevent documents from being fed from the magazine by the operation of push-button control slide 292 whenever the solenoid 132 is energized. Therefore, for all of the different conditions that normally will happen in the operation of a machine of this character, automatic controls are provided for automatically preventing the feed of documents from the magazine except when the machine is in proper condition for operation to feed and photograph documents in the normal manner. The machine is constructed and designed also to guard against the mutilation of documents during the feeding thereof through the arrangement and positioning of the various feed rolls and document guide plates.

It will also be noted that whenever a document is not fed, that primary and secondary control fingers 78 and 82 will not be moved and therefore neither the lights will be turned on nor the clutch operated to feed film thereby preventing the wasting of film without requiring the operator's attention.

It will be further understood that the document feed unit including magazine 100 and the feed mechanism mounted in side plates 90 and 91 may be readily engaged and disengaged in position between side walls 3 and 4 so that it may be replaced by any automatic sheet feeding device operating in a similar manner that will feed documents direct from the magazine into feed rolls 45 and 46 without reversing them. This substitution can be made by merely adding a plurality of feed rolls for operation in conjunction with magazine unit 100 and the same control mechanism will automatically control the entire operation of the machine in the same manner as herein described, it being a particularly advantageous feature of the machine to have the feed of documents stopped at the magazine and documents already fed continuously moved through the machine, photographed and stacked in the receiving member in order that all of the documents may be readily removed from the machine without difficulty.

The invention claimed is:

1. In a document photographing machine, a document feed magazine for receiving a plurality of documents, a receiving member, document feed means for feeding documents one at a time from said magazine in successive order through a photographing position and into said receiving member while maintaining fed documents in close adjacent relation during feeding with a small substantially uniform space separating the trailing and leading edges of successive documents, lighting means movable into and out of operative position relative to said document feed means, main driving means for operating said document feed means, and means operated by said lighting means to prevent the feeding of documents from said magazine when said lighting means is in the inoperative position.

2. In a document photographing machine, document feed means, lighting means for illuminating documents being fed, a frame mounting said lighting means for movement into operative and inoperative positions relative to said document feed means, drive means for said document feed means, and means actuated by said frame operable to control said drive means for preventing operation of said document feed means by said drive means when said frame is in inoperative position.

3. In a document photographing machine, a document feed magazine for receiving a plurality of documents, means for feeding documents from said magazine one at a time in successive order, conveyor means for receiving documents from said feed means and conveying them through a photographing position for subsequent discharge into a receiver, film feeding means for feeding a film strip in a camera for photographing said documents as they pass through said photographing position, driving means for operating said means for feeding documents from said magazine, said conveyor means and said film feeding means in synchronized relation in photographing documents on said film, means operable upon failure of film feed for stopping the operation of said means for feeding documents from said magazine to stop feeding of documents from said magazine, and means controlled by fed documents engaged in said conveyor means independently controlling said means for feeding documents from said magazine, said conveyor means continuing the feed of said fed documents through said photographing position independently of the operation of said means operable upon failure of film feed.

4. In a document photographing machine, a document feed magazine for receiving a plurality of documents, means for feeding documents from said magazine one at a time in successive order, conveyor means for receiving documents from said feed means and conveying them through a photographing position for subsequent discharge into a receiver, film feeding means for supporting and feeding film in a camera for photographing documents as they pass through said photographing position, driving means for operating said document feed means, conveyor means and film feed means in synchronized relation in photographing documents on said film, document actuated control means normally operative to prevent feeding of documents from said magazine actuated into inoperative position by fed documents engaged in said conveyor means, manually actuated starting means for for starting operation of said means to feed documents from said magazine into said conveyor means for passage through said photographing position and operating said document control means into inoperative position, and means operable independent of said starting means and document actuated control means for stopping the operation of said means for feeding documents from said magazine upon breakage of film being fed by said film feeding means, said conveyor means being continuously operable to continue feeding documents engaged therein through photographing position independently of the failure of feed of a document from said magazine caused by film breakage through stopping the operation of said means for feeding documents from said magazine.

5. In a document photographing machine, a document feed magazine for receiving a plurality of documents, means for feeding documents from said magazine one at a time in successive order, conveyor means for receiving documents from said feed means and conveying them through a photographing position for discharge into a receiver, a camera for photographing said documents as they pass through said photographing position on a film strip therein, means for removably mounting the camera in said machine, driving means for operating said document feed means, said conveyor means and said camera when operatively engaged in said machine in synchronized relation in photographing documents, document actuated control means operable by fed documents carried by said conveyor means for stopping operation of said feed means and feed of documents from said magazine whenever said control means is not substantially continuously operated by documents, manually actuated starting means for starting operation of said means for feeding documents from said magazine into said conveyor means past photographing position and until said documents opperate said document actuated control means, and means for stopping said means for feeding documents from said magazine independently of said document actuated control means whenever said camera is removed from said means for mounting it in the machine.

6. In a document photographing machine, a document feed magazine for receiving a plurality of documents, means for feeding documents from said magazine one at a time in successive order, conveyor means for receiving documents from said feed means and conveying them through a photographing position for subsequent discharge into a receiver, film feeding means in a camera for supporting and feeding film to photograph documents passing through said photographing position, driving means for operating said document feed means, said film feeding means and continuously operating said conveyor means, document controlled means for connecting said film feeding means to said driving means for feeding film to photograph documents as they pass through said photographing position, and means actuated by documents being conveyed by said conveyor means for stopping the operation of said means for feeding documents from said magazine whenever said document actuated means is not document actuated for a predetermined length of time, said conveyor means and document controlled means being operable so that documents engaged in said conveyor means are conveyed through said photographing position to discharge into said receiver independently of the operation of said means for feeding documents from said magazine by said document actuated control means.

7. In a document photographing machine, a document feed magazine for receiving a plurality of documents, means for feeding documents from said magazine one at a time in successive order, conveyor means for receiving documents from said feed means and conveying them through a photographing position for subsequent discharge into a receiver, film feeding means for supporting film in a camera and feeding said film in photographing documents conveyed through said photographing position, driving means for operating said means for feeding documents from said magazine, said film feeding means and continuously operating said conveyor means, document controlled means for connecting said film feeding means to said drive means for operation thereby, document acuated control means operable by fed documents carried by said conveyor means for stopping operation of said means for feeding documents from said magazine whenever said control means is not substantially continuously operated by documents, and means actuated by the exhausting of film suply for said film feed means to independently stop said means for feeding documents from said magazine, said conveyor means having its operation continued by said drive means to deliver fed documents to said receiver.

8. In a document photographing machine, a document feed magazine for receiving a plurality of documents, means for feeding documents from said magazine one at a time in successive order, conveyor means for receiving documents from said feed means and conveying them through a photographing position for discharge into a receiver, film feeding means for supporting film in a camera having supply and receiving spools for said film, driving means for operating said means for feeding documents from said magazine, fed film feeding means and continuously operating said conveyor means, document controlled means for connecting said film feed means to said drive means for operation thereby, document actuated control means operable by fed documents carried by said conveyor means for stopping operation of said means for feeding documents from said magazine whenever said document actuated control means is not substantially continuously operated by documents, and means actuated when the film wound on said receiving spool substantially fills said spool for stopping the operation of said means for feeding documents from said magazine while said conveyor means is operated by said drive means to convey fed documents through said photographing position and into said receiver.

9. In a document photographing machine, a document feed magazine for receiving a plurality of documents, means for feeding documents from said magazine one at a time in successive order, conveyor means for receiving documents from said feed means and conveying them through a photographing position for subsequent discharge into a receiver, film feeding means in a camera for supporting and feeding film therein in photographing documents thereon passing through said photographing position, driving means for operating said means for feeding documents from said magazine, said conveyor means and said film feeding means in synchronized relation in photographing documents, a lead strip feed operable independently of said driving means to operate said film feeding means for feeding film in said camera, means controlled by said lead strip feed for stopping operation of said means for feeding documents from said magazine during the operation thereof, said conveyor means continuing the feed of fed documents into said receiver after said means for feeding documents from said magazine has been stopped, and manually operable means for controlling operation of said lead strip feed.

10. In a document photographing machine, a document feed magazine for receiving a plurality of documents, means for delivering documents from said magazine one at a time in successive order, conveyor means for receiving fed documents from said delivering means, conveying them through a photographing position and subsequently delivering them into a receiver, film feeding means for supporting and feeding film in a camera for photographing documents as they pass through said photographing position, and means for stopping the operation of said delivering means to stop feed of documents from said magazine upon failure of film feed by said film feeding means while said conveyor means continues conveying fed documents through photographing position.

11. An apparatus for handling and copying records comprising a copying machine for photographing records including a camera adapted to contain a film, means operatively connected to said camera for advancing a film therethrough during the photographing of records, a second film-advancing means for advancing a predetermined length of the same film through the camera, feeding means for successively delivering records into the copying machine, means controlling operation of said feeding means, and means controlled by said second film-advancing means for rendering the feeding means inoperative while said predetermined length of film is being advanced through the camera.

RAYMOND M. HESSERT.
FRIEDRICH J. SCHUTT.

REFERENCES CITED

The following references are of record in the file of this patent:

UNITED STATES PATENTS

| Number | Name | Date |
|---|---|---|
| 1,806,763 | McCarthy | May 26, 1931 |
| 1,826,992 | Carroll | Oct. 13, 1931 |
| 1,889,958 | French et al. | Dec. 6, 1932 |
| 1,912,708 | Hopkins | June 6, 1933 |
| 1,957,889 | Hopkins et al. | May 8, 1934 |
| 1,966,348 | Hughey | July 10, 1934 |
| 1,976,346 | Hughey | Oct. 9, 1934 |
| 2,150,243 | Page | Mar. 14, 1939 |
| 2,161,391 | Schubert | June 6, 1939 |
| 2,177,135 | Fassel | Oct. 24, 1939 |
| 2,186,986 | Nelson | Jan. 16, 1940 |
| 2,194,808 | Pooley, Jr. | Mar. 26, 1940 |
| 2,201,009 | Oiler | May 14, 1940 |
| 2,203,000 | Smith | June 4, 1940 |
| 2,217,120 | Liebman | Oct. 8, 1940 |
| 2,235,844 | Nelson | Mar. 25, 1941 |
| 2,251,570 | Hessert | Aug. 5, 1941 |
| 2,291,006 | Stuart | July 28, 1942 |
| 2,304,273 | Nelson | Dec. 8, 1942 |
| 2,391,274 | Schubert | Dec. 18, 1945 |
| 2,461,185 | Schubert | Feb. 8, 1949 |